United States Patent
Zhang et al.

(10) Patent No.: US 10,181,881 B2
(45) Date of Patent: *Jan. 15, 2019

(54) SOUNDING AND STEERING PROTOCOLS FOR WIRELESS COMMUNICATIONS

(71) Applicant: Marvell World Trade Ltd., St. Michael (BB)

(72) Inventors: Hongyuan Zhang, Fremont, CA (US); Hui-Ling Lou, Sunnyvale, CA (US); Rohit U. Nabar, Sunnyvale, CA (US); Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 68 days.

This patent is subject to a terminal disclaimer.

(21) Appl. No.: 15/048,867

(22) Filed: Feb. 19, 2016

(65) Prior Publication Data

US 2016/0173179 A1 Jun. 16, 2016

Related U.S. Application Data

(63) Continuation of application No. 14/015,722, filed on Aug. 30, 2013, now Pat. No. 9,270,431, which is a
(Continued)

(51) Int. Cl.
*H04B 7/0456* (2017.01)
*H04B 7/0413* (2017.01)
(Continued)

(52) U.S. Cl.
CPC ......... *H04B 7/0456* (2013.01); *H04B 7/0413* (2013.01); *H04B 7/0617* (2013.01);
(Continued)

(58) Field of Classification Search
None
See application file for complete search history.

(56) References Cited

U.S. PATENT DOCUMENTS 6,127,971 A 10/2000 Calderbank
7,372,830 B2 5/2008 Jung
(Continued)

FOREIGN PATENT DOCUMENTS

CN 1902874 A 1/2007
CN 101064544 A 10/2007
(Continued)

OTHER PUBLICATIONS

European Patent Application No. 10730596.3, European Patent Office, Communication pursuant to Article 94(3) EPC, dated Jan. 17, 2017, 8 Pages.
(Continued)

*Primary Examiner* — Andrew Lai
*Assistant Examiner* — Jamaal R Henson

(57) ABSTRACT

Systems, apparatuses, and techniques relating to wireless local area network devices are described. A described technique includes transmitting a sounding packet to wireless communication devices; receiving, in response to the sounding packet, feedback packets from the wireless communication devices, wherein the feedback packets collectively comprise beamforming feedback, the beamforming feedback being derived from received versions of the sounding packet; determining a steering matrix based on the beamforming feedback; and transmitting, within a frame, spatially steered data packets to the wireless communications devices. The spatially steered data packets can be based on the steering matrix and data streams intended respectively for the wireless communication devices. The spatially steered data packets can concurrently provide the data streams respectively within the frame to the wireless communication devices via different spatial wireless channels.

19 Claims, 17 Drawing Sheets

Related U.S. Application Data continuation of application No. 13/610,654, filed on Sep. 11, 2012, now Pat. No. 8,526,892, which is a continuation of application No. 12/750,636, filed on Mar. 30, 2010, now Pat. No. 8,270,909.

(60) Provisional application No. 61/165,249, filed on Mar. 31, 2009.

(51) Int. Cl.
  *H04B 7/06* (2006.01)
  *H04L 5/00* (2006.01)

(52) U.S. Cl.
  CPC ......... *H04B 7/0619* (2013.01); *H04B 7/0626* (2013.01); *H04B 7/0634* (2013.01); *H04B 7/0697* (2013.01); *H04L 5/0048* (2013.01)

(56) References Cited

U.S. PATENT DOCUMENTS

| | | | |
|---|---|---|---|
| 7,436,903 B2 | 10/2008 | Sandhu | |
| 7,532,681 B2 | 5/2009 | Takeda | |
| 7,804,800 B2 * | 9/2010 | Li | H04B 7/0447 370/334 |
| 8,144,647 B2 | 3/2012 | Nabar | |
| 8,194,720 B2 | 6/2012 | Yamaura | |
| 8,467,345 B2 | 6/2013 | Abraham | |
| 2004/0136465 A1 | 7/2004 | Hwang | |
| 2005/0047384 A1 | 3/2005 | Wax | |
| 2006/0009189 A1 | 1/2006 | Kim | |
| 2006/0153227 A1 | 7/2006 | Hwang | |
| 2006/0193340 A1 | 8/2006 | Jones | |
| 2006/0250938 A1 | 11/2006 | Khan | |
| 2007/0049208 A1 | 3/2007 | Kim | |
| 2007/0086400 A1 | 4/2007 | Shida | |
| 2007/0153754 A1 | 7/2007 | Shapira | |
| 2007/0211620 A1 | 9/2007 | McBeath | |
| 2007/0211823 A1 | 9/2007 | Mazzarese | |
| 2007/0230373 A1 | 10/2007 | Li | |
| 2007/0298742 A1 * | 12/2007 | Ketchum | H04B 7/0617 455/186.1 |
| 2008/0014870 A1 * | 1/2008 | Kim | H04B 7/0417 455/69 |
| 2008/0014892 A1 * | 1/2008 | Aldana | H04B 7/0691 455/277.1 |
| 2008/0045153 A1 * | 2/2008 | Surineni | H04B 7/0417 455/63.1 |
| 2008/0109711 A1 | 5/2008 | Morioka | |
| 2008/0181323 A1 | 7/2008 | Waters | |
| 2008/0212538 A1 | 9/2008 | Molisch | |
| 2008/0299962 A1 | 12/2008 | Kasher | |
| 2009/0097395 A1 * | 4/2009 | Zhang | H04B 7/0417 370/203 |
| 2010/0046656 A1 | 2/2010 | Van Nee | |
| 2010/0054368 A1 | 3/2010 | Feng | |
| 2010/0195586 A1 | 8/2010 | Choi | |
| 2010/0260138 A1 | 10/2010 | Liu | |
| 2010/0260159 A1 | 10/2010 | Zhang | |
| 2011/0038332 A1 | 2/2011 | Liu | |

FOREIGN PATENT DOCUMENTS

| | | |
|---|---|---|
| EP | 1879301 A2 | 1/2008 |
| EP | 1357693 B1 | 6/2010 |
| EP | 1598975 B1 | 3/2014 |
| JP | 2005347948 A | 12/2005 |
| JP | 2007509530 T | 4/2007 |
| JP | 2007318730 A | 12/2007 |
| JP | 2008010904 A | 1/2008 |
| JP | 2008500765 T | 1/2008 |
| JP | 2008544653 T | 12/2008 |
| WO | WO2003041300 A1 | 5/2003 |
| WO | WO2005039105 A1 | 4/2005 |
| WO | WO2005004500 A3 | 12/2005 |
| WO | WO2007117949 A1 | 10/2007 |
| WO | WO2008002972 A3 | 5/2008 |
| WO | WO2008083399 A3 | 9/2008 |
| WO | WO2009027931 A3 | 4/2009 |
| WO | WO2009009199 A3 | 9/2009 |
| WO | WO2010022255 A1 | 2/2010 |

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.

"Part 11: Wireless LAN Medium Access Control (MAC) and Physical Layer (PHY) specifications: High-Speed Physical Layer in the 5 GHz Band," IEEE Std. 802.11a (1999), 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification," IEEE Std. 802.11n (2005), 131 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 535 pages.

International Search Report and Written Opinion for App. Ser. No. PCT/US2010/029275, dated Aug. 12, 2010, 14 pages.

Notice of Reasons for Rejection, JP Application No. 2012-503630, dated Nov. 19, 2013, 2 pages.

Sophie Vrzic et al., Proposal for IEEE 802.16m DL MIMO Schemes, IEEE C802.16m-08/342rI, May 12, 2008, pp. 1-17.

First Office Action, CN Application No. 201080014699.7, dated Oct. 9, 2013, 4 pages.

Stephens, IEEE P802.11-05/1095r5, "Joint Proposal: High throughput extension to the 802.11 Standard: MAC", Jan. 13, 2006, pp. 1-104.

Agere Systems, Inc., et al., TGn Sync: An IEEE 802.11n Protocol Standard Proposal Alliance, PHY Overview, IEEE, Jun. 2004, pp. 1, 18-22.

Japanese Patent Application No. 2012-503630, Notice of Reasons for Rejection, dated Mar. 18, 2014.

Notification of Transmittal of the International Search Report and the Written Opinion of the International Searching Authority, or the Declaration dated Dec. 23, 2008 in reference to PCT/US2008/070466.

ANSI/IEE Std. 802.11, 1999 Edition; Information technology—Telecommunications and information exchange between systems—Local and metropolitan area networks—Specific requirements—part 11: Wireless LAN Medium Access Control (MAC) and Physical Layer (PHY) Specifications; LAN/MAN Standards Committee of the IEEE Computer Society; Aug. 20, 1999; 531 pages.

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5

(56) References Cited

OTHER PUBLICATIONS

GHz Band; LAN/MAN Standards Committee of the IEEE Computer Society; Sep. 16, 1999; 91 pages.
IEEE Std 802.11b-1999 (Supplement to IEEE Std 802.11-1999 Edition); Supplement to IEEE Standard for Information technology—Telecommunications and information exchange between systems—Local and Metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.
IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.
IEEE Std. 802.11h™—2003 [Amendment to IEEE Std 802.11™, 1999 Edition (Reaff 2003); IEEE Standard for Information technology—Telecommunications and information exchange between systems—Local and metropolitan area networks—Specific requirements; Part 11: Wireless LAN Medium Access Control (MAC) and Physical Layer (PHy) specifications; Amendment 5: Spectrum and Transmit Power Management Extensions in the 5 GHz band in Europe; IEEE Computer Society; LAN/MAN Standards Committee; Oct. 14, 2003; 75 pages.
IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.
Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92, vol. 2 & 3, pp. 1-814; vol. 4, pp. 1-250.
International Search Report and Written opinion for PCT/US2010/030750, dated Jul. 20, 2010, 9 pages.
IEEE P802.11n™/D3.00, Draft Standard for Information Technology—Telecommunications and information echange between systems—Local and metropolitan area networks—Specific requirements, Part 11; Wireles LAN Medium Access Control (MAC) and Physical Layer (PHY) specifications: Amendment 4: Enhancements for Higher Throughput, The Institute of Electrical and electronics Engineers, Inc., Sep. 2007.
IEEE Std 802.11b-2001 (corrigendum to IEEE Sd. 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.
van Nee, et al., "The 802.11N MIMO-OFDM Standard for Wireless LAN and Beyond," Wireless Personal Communications, vol. 37, pp. 445-453 (Jun. 2006).
IEEE P802.11n™/D9.0, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 5: Enhancements for Higher Throughput, The Institute of Electrical and Electronics Engineers, Inc., Mar. 2009.
Stacey et al., "Specification Framework for TGac," document No. IEEE 802.11-09/0992R13, Institute for Electrical and Electronics Engineers, pp. 1-20, Jul. 2010.
Zhang et al., "802.11ac Preamble," document No. IEEE 802.11-10/0070r0, Institute for Electrical and Electronics Engineers, pp. 1-11, Jan. 18, 2010.
Draft Amendment to Standard for Information Technology—Telecommunications and information exchange between systems—Local and metropolitan area networks—Specific Requirements—IEEE P802.11n™/D1.04, Sep. 2006, pp. i-318.
IEEE Std. 802.11n™—2009 IEEE Standard for Information Technology—Telecommunications and information exchange between systems—Local and Metropolitan area networks—Specific requirements, Part 11: Wireless LAN Medium Access Control (MAC) and Physical Layer (PHY) Specifications, Amendment 5: Enhancements for Higher Throughput, The Institute of Electrical and Electronics Engineers, Inc., Oct. 2009.
Zhang et al., "Exploiting Multi-Antennas for Opportunistic Spectrum Sharing in Cognitive Radio Networks," IEEE the 18th Annual IEEE International Symposium on Personal, Indoor and Mobile Radio Communications (PIMRC), 2007, 5 pages.
Korean Patent Application No. 10-2011-7022883, Korean Intellectual Property Office, Notice of Office Action, dated Apr. 18, 2016, 5 pages.

\* cited by examiner

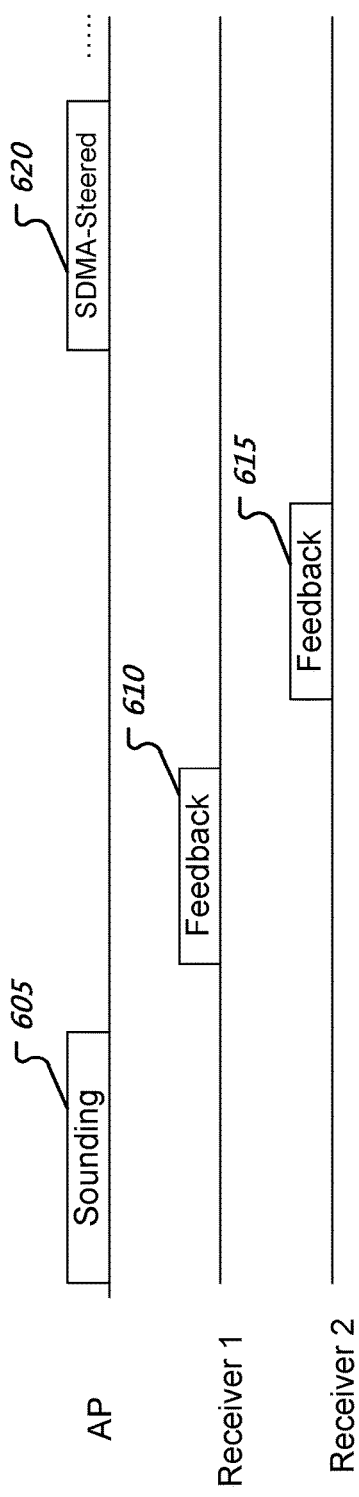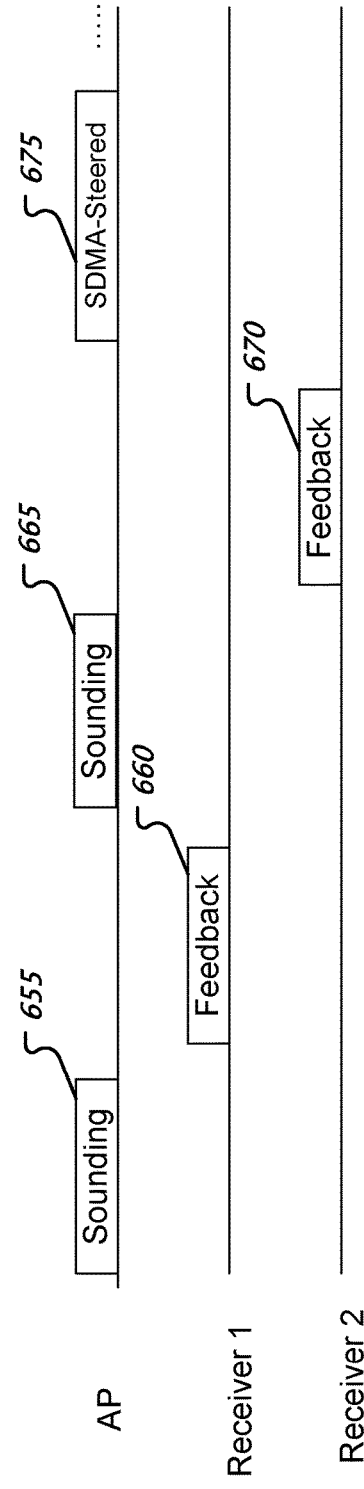

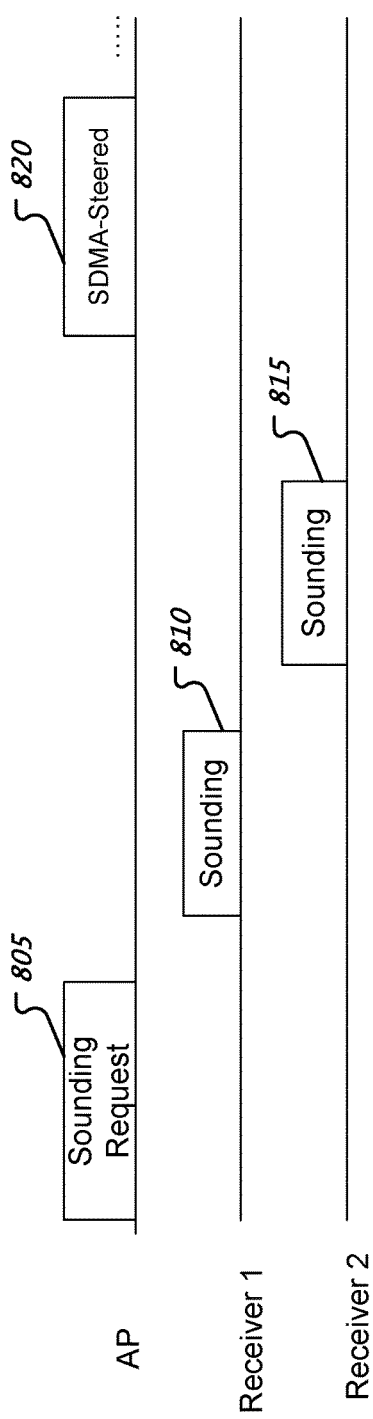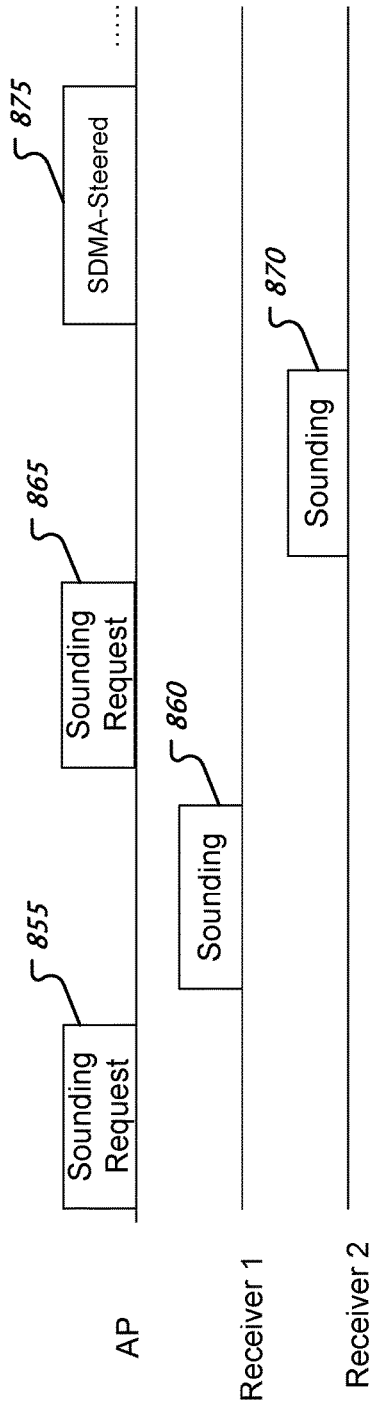
Fig. 8A
Fig. 8B

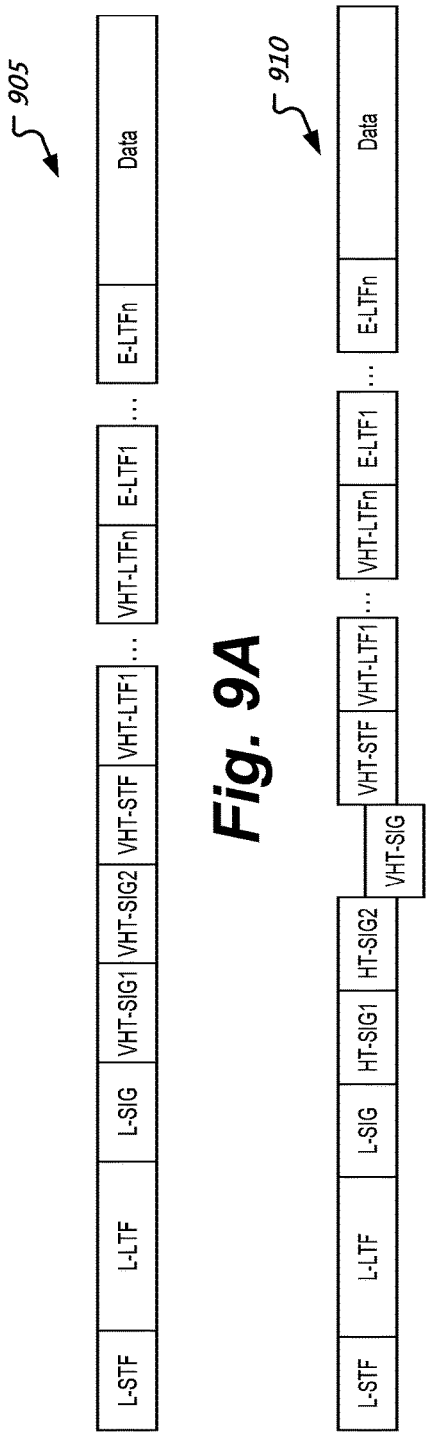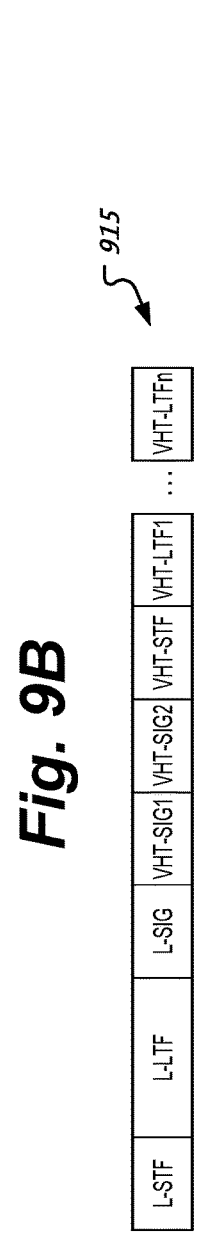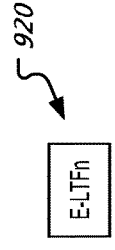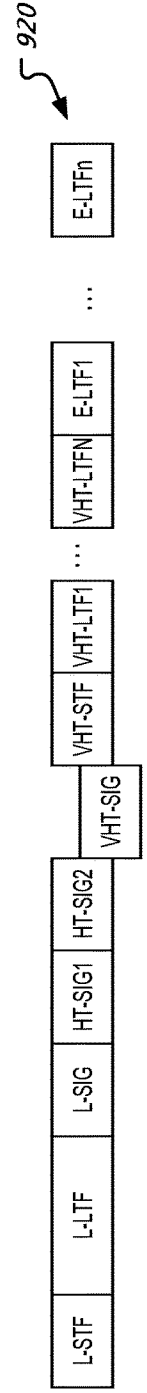
Fig. 9A
Fig. 9B
Fig. 9C
Fig. 9D

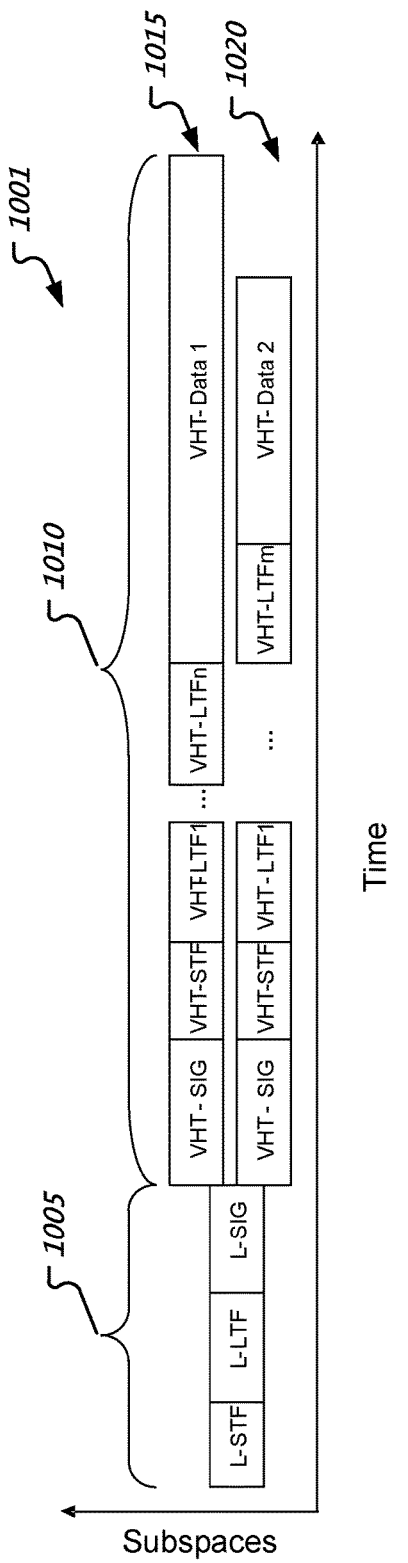
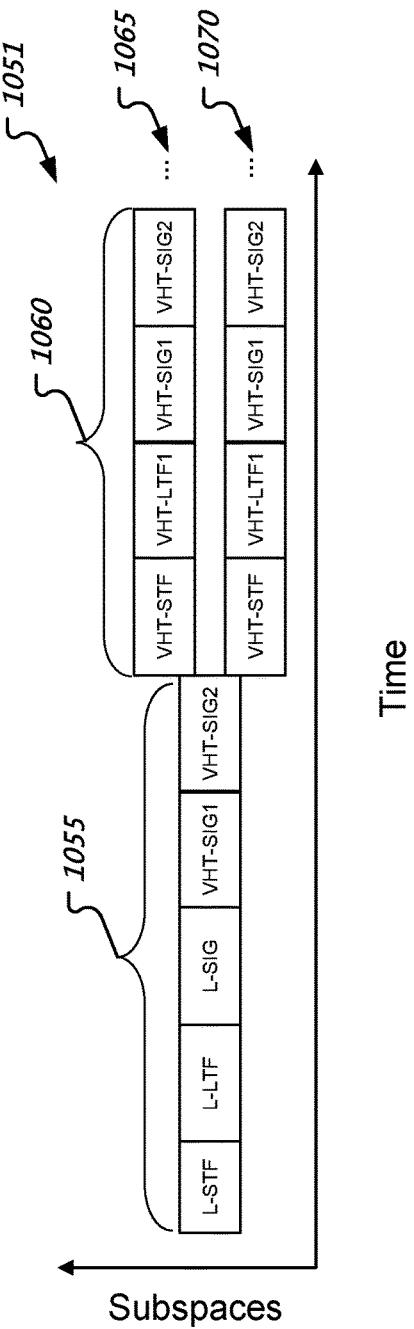
Fig. 10A
Fig. 10B

SOUNDING AND STEERING PROTOCOLS FOR WIRELESS COMMUNICATIONS

CROSS REFERENCE TO RELATED APPLICATIONS

This disclosure is a continuation of and claims the benefit of the priority of U.S. patent application Ser. No. 14/015,722, filed Aug. 30, 2013 and entitled "Sounding and Steering Protocols for Wireless Communications" (now U.S. Pat. No. 9,270,431), which is a continuation of and claims the benefit of the priority of U.S. patent application Ser. No. 13/610,654, filed Sep. 11, 2012 and entitled "Sounding and Steering Protocols for Wireless Communications" (now U.S. Pat. No. 8,526,892), which is a continuation of and claims the benefit of the priority of U.S. patent application Ser. No. 12/750,636, filed Mar. 30, 2010 and entitled "Sounding and Steering Protocols for Wireless Communications" (now U.S. Pat. No. 8,270,909), which claims the benefit of the priority of U.S. Provisional Application Ser. No. 61/165,249, filed Mar. 31, 2009 and entitled "SDMA Sounding and Steering Protocol for WLAN." The above identified applications are incorporated herein by reference in their entirety.

BACKGROUND

Wireless Local Area Networks (WLANs) include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a or IEEE 802.11n, can use OFDM to transmit and receive signals. Moreover, WLANs, such as ones based on the IEEE 802.11n standard, can use OFDM and MIMO.

SUMMARY

The present disclosure includes systems, apparatuses, and techniques for wireless local area networks.

Systems, apparatuses, and techniques for wireless local area networks can include communicating with multiple wireless communication devices to determine characteristics of spatial wireless channels. The spatial wireless channels can be respectively associated with the wireless communication devices. The systems, apparatuses, and techniques can include determining steering matrices based on one or more outputs of the communicating. The steering matrices can be respectively associated with the wireless communication devices. The systems, apparatuses, and techniques can include transmitting signals that concurrently provide data to the wireless communication devices via different spatial wireless channels. The signals can be spatially steered to the wireless communication devices based on the steering matrices.

Systems, apparatuses, and techniques for wireless local area networks can include one or more of the following features. Communicating with the wireless communication devices can include transmitting, in a frequency band, one or more sounding packets to the wireless communication devices. Communicating with the wireless communication devices can include receiving, in response to the one or more sounding packets, feedback packets from the wireless communication devices. In some implementations, a feedback packet is derived from a wireless channel estimation that is based on a received sounding packet.

In some implementations, receiving the feedback packets can include receiving a first channel state information from a first device of the wireless communication devices and receiving a second channel state information from a second device of the wireless communication devices. Determining the steering matrices can include determining a first steering matrix based at least on the second channel state information. Determining the steering matrices can include determining a second steering matrix based at least on the first channel state information.

In some implementations, receiving feedback packets can include receiving beam forming information indicative of a first feedback matrix from a first device of the wireless communication devices. Receiving feedback packets can include receiving beam forming information indicative of a second feedback matrix from a second device of the wireless communication devices. Determining the steering matrices can include determining a first steering matrix based at least on the first feedback matrix. Determining the steering matrices can include determining a second steering matrix based at least on the second feedback matrix.

In some implementations, receiving feedback packets can include receiving interference rejection information indicative of a first interference matrix from a first device of the wireless communication devices. Receiving feedback packets can receiving interference rejection information indicative of a second interference matrix from a second device of the wireless communication devices. In some implementations, the first interference matrix is based on a null space of a wireless channel matrix associated with the first device. In some implementations, the second interference matrix is based on a null space of a wireless channel matrix associated with the second device. Determining the steering matrices can include determining a first steering matrix based at least on the second interference matrix. Determining the steering matrices can include determining a second steering matrix based at least on the first interference matrix.

Communicating with the wireless communication devices can include transmitting, in a frequency band, one or more sounding requests to the wireless communication devices. Communicating with the wireless communication devices can include receiving, in response to the one or more sounding requests, sounding packets from the wireless communication devices. Determining the steering matrices can include estimating wireless channel matrices based on the received sounding packets.

Communicating with the wireless communication devices can include sending a first sounding packet to perform sounding on a first group of antennas and sending a second sounding packet to perform sounding on a second group of antennas. Transmitting the signals can include using the first group of antennas and the second group of antennas. Implementations can include transmitting signaling information that causes one or more legacy devices to ignore processing a space division multiple access (SDMA) frame and to prevent the one or more legacy devices from transmitting during a transmission of the SDMA frame.

Details of one or more implementations are set forth in the accompanying drawings and the description below. Other features and advantages may be apparent from the description and drawings, and from the claims.

DRAWING DESCRIPTIONS

FIG. 6A shows an example of an explicit sounding timing diagram.

FIG. 6B shows another example of an explicit sounding timing diagram.

FIG. 8A shows an example of an implicit sounding timing diagram.

FIG. 8B shows another example of an implicit sounding timing diagram.

FIG. 9A shows an example of a staggered sounding packet.

FIG. 9B shows another example of a staggered sounding packet.

FIG. 9C shows an example of a null data packet based sounding packet.

FIG. 9D shows another example of a null data packet based sounding packet.

FIG. 10A shows an example of a space division multiple access based frame.

FIG. 10B shows another example of a space division multiple access based frame.

Like reference symbols in the various drawings indicate like elements.

DETAILED DESCRIPTION

Figure 1A:
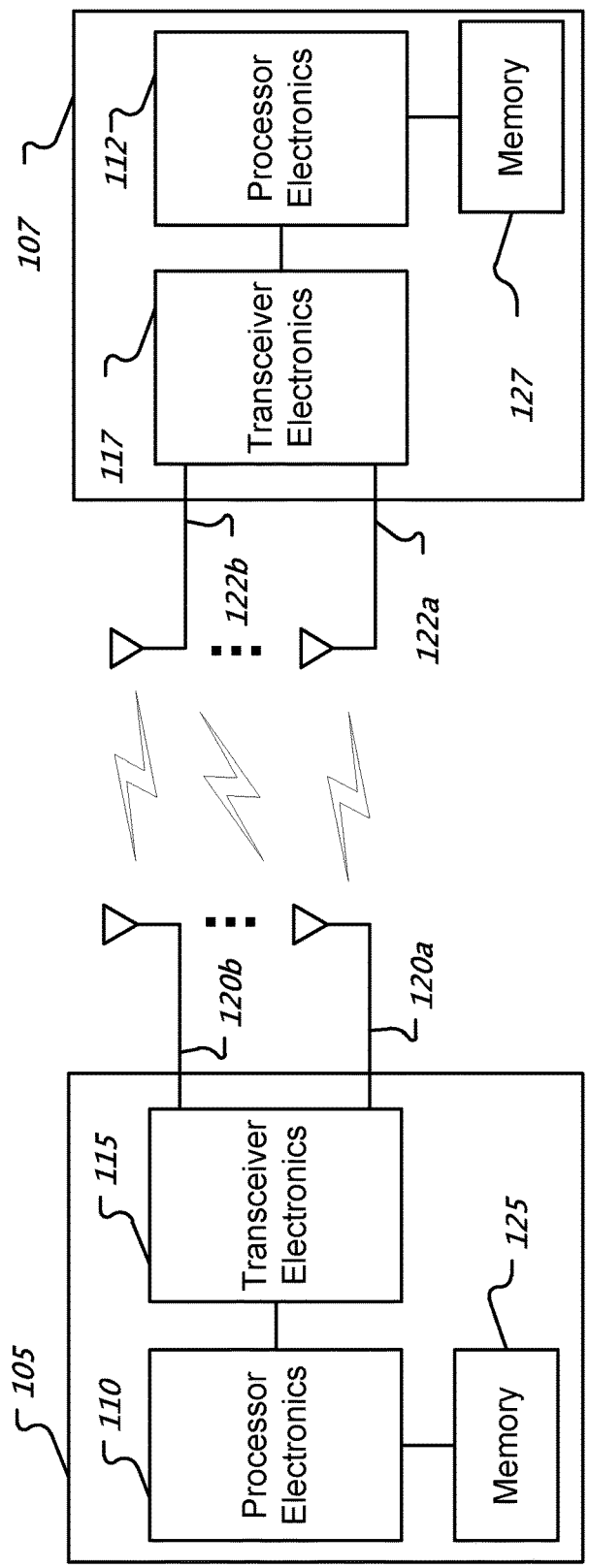
FIG. 1A shows an example of a wireless local area network with two wireless communication devices.

FIG. 1A shows an example of a wireless local area network with two wireless communication devices. Wireless communication devices 105, 107 such as an access point (AP), base station (BS), access terminal (AT), client station, or mobile station (MS) can include processor electronics 110, 112 such as one or more processors that implement methods effecting the techniques presented in this disclosure. Wireless communication devices 105, 107 include transceiver electronics 115, 117 to send and/or receive wireless signals over one or more antennas 120a, 120b, 122a, 122b. In some implementations, transceiver electronics 115, 117 include multiple radio units. In some implementations, a radio unit includes a baseband unit (BBU) and a radio frequency unit (RFU) to transmit and receive signals. Wireless communication devices 105, 107 include one or more memories 125, 127 configured to store information such as data and/or instructions. In some implementations, wireless communication devices 105, 107 include dedicated circuitry for transmitting and dedicated circuitry for receiving.

A first wireless communication device 105 can transmit data to two or more devices via two or more orthogonal spatial subspaces, e.g., orthogonal Space Division Multiple Access (SDMA) subspaces. For example, the first wireless communication device 105 can concurrently transmit data to a second wireless communication device 107 using a spatial wireless channel and can transmit data to a third wireless communication device (not shown) using a different spatial wireless channel. In some implementations, the first wireless communication device 105 implements a space division technique to transmit data to two or more wireless communication devices using two or more spatial multiplexing matrices to provide spatial separated wireless channels in a single frequency band.

Wireless communication devices 105, 107 in a WLAN can use one or more protocols for medium access control (MAC) and Physical (PHY) layers. For example, a wireless communication device can use a Carrier Sense Multiple Access (CSMA) with Collision Avoidance (CA) based protocol for a MAC layer and OFDM for the PHY layer. A MIMO-based wireless communication device can transmit and receive multiple spatial streams over multiple antennas in each of the tones of an OFDM signal.

Wireless communication devices 105, 107 are sometimes referred to as transmitters and receivers for convenience. For example, a "transmitter" as used herein refers to a wireless communication device that receives and transmits signals. Likewise, a "receiver" as used herein refers to a wireless communication device that receives and transmits signals.

Wireless communication devices such as a MIMO enabled AP can transmit signals for multiple client wireless communication devices at the same time in the same frequency band by applying one or more transmitter side beam forming matrices to spatially separate signals associated with different client wireless communication devices. Based on different interference patterns at the different antennas of the wireless communication devices, each client wireless communication device can discern its own signal. A MIMO enabled AP can participate in sounding to obtain channel state information for each of the client wireless communication devices. The AP can compute spatial multiplexing matrices such as spatial steering matrices based on the different channel state information to spatially separate signals to different client wireless communication devices.

This disclosure provides details and examples of techniques and systems for space division multiple access based sounding, steering, and communications, in general. One or more of the described techniques and systems include sounding protocols to sound multiple antennas of a wireless communication device. One or more of the described techniques and systems include steering protocols to steer communication signals to wireless communication devices based on output from a sounding process.

A transmitter can use a transmission signal model to generate SDMA transmission signals for two or more receivers. Generating SDMA transmission signals can include using spatial multiplexing matrixes associated with respective receivers. A transmitter can construct a multiplexing matrix W for client receivers based on interference avoidance and/or signal-to-interference and noise ratio (SINR) balancing. Interference avoidance attempts to minimize the amount of non-desired signal energy arriving at a receiver. Interference avoidance can ensure that signals intended for a particular receiver arrive only at that particular receiver and cancel out at a different receiver. A transmitter can perform SINR balancing. SINR balancing can include determining multiplexing matrices to actively control the SINRs observed at different receivers. For example, one SINR balancing approach can include maximizing the minimum SINR across serviced receivers.

A transmitter can simultaneously communicate with multiple receivers via different spatial wireless channels. The transmitter can use multiplexing matrices, such as steering matrices, to transmit information on different spatial wireless channels. The transmitter can multiply a transmission vector for the i-th receiver by a respective multiplexing matrix. The multiplexing matrix for each receiver can differ. A multiplexing matrix can be a function of the wireless channel between the transmitter and the receiver. The transmitter can combine steered signal vectors corresponding to the different receivers to produce transmission signals that simultaneously transmit different information to respective receivers.

In some implementations, a transmitter uses an OFDM transmission signal model based on $$s = \sum_{i=1}^{N} W_i x_i$$

where s is a transmitted signal vector for one tone, N is a number of simultaneously serviced receivers, $x_i$ is an information vector ($T_i \times 1$, $T_i \leq P_i$) intended for the i-th receiver, $W_i$ is a multiplexing matrix ($M \times T_i$) for the i-th receiver, M is a number of transmit antennas of the transmitter, and $P_i$ is the number of receive antennas of the i-th receiver.

In some implementations, a wireless communication device can determine multiple wireless channel matrices $H_k^i$ based on one or more received signals. Here, $H_k^i$ represents the channel conditions for the k-th tone associated with the i-th receiver. A transmitter can transmit on multiple tones to two or more receivers. For example, the first tone received by the first receiver can be expressed as $H_1^1[W_1^1 x_1 + W_1^2 x_2 + \ldots + W_1^N x_s]$, where $W_k^i$ is the multiplexing matrix for the i-th receiver at the k-th tone.

A multiplexing matrix W can be selected to cause the first receiver to receive $H_1^1 W_1^1 x_1$ and to have the remaining signals $x_2, x_3, \ldots, x_s$ be in a null space for the first receiver. Therefore, when using a signal interference approach, the values of the multiplexing matrix W are selected such that $H_1^1 W_1^2 \approx 0, \ldots, H_1^1 W_1^N \approx 0$. In other words, the multiplexing matrix W can adjust phases and amplitudes for these OFDM tones such that a null is created at the first receiver. That way, the first receiver can receive the intended signal $x_1$ without interference from other signals $x_2, x_3, \ldots, x_s$ intended for the other receivers.

In general, a received signal can include a signal component intended for i-th receiver and one or more co-channel interference components from one or more signals intended for one or more other receivers. For example, a received signal at the i-th receiver is expressed by:

$$y_i = H_i W_i x_i + H_i \sum_{j \neq i} W_j x_j + n_i$$

where $H_i$ represents a wireless channel matrix associated with a wireless channel between a transmitter and the i-th receiver, and $n_i$ represents noise at the i-th receiver. The summation is over values of j corresponding to receivers other than the i-th receiver.

When servicing multiple receivers simultaneously, power available at a transmitter can be allocated across multiple receivers. This, in turn, affects the SINR observed at each of the receivers. The transmitter can perform flexible power management across the receivers. For example, a receiver with low data rate requirements can be allocated less power by the transmitter. In some implementations, transmit power is allocated to receivers that have high probability of reliable reception (so as not to waste transmit power). Power can be adjusted in the corresponding multiplexing matrix W and/or after using other amplitude adjustment methods.

A transmitter device can determine a multiplexing matrix W associated with a receiver based on channel conditions between the transmitter and the receiver. The transmitter and the receiver can perform sounding to determine wireless channel characteristics. Various examples of sounding techniques include explicit sounding and implicit sounding.

In some implementations, a device can transmit sounding packets based on pre-determined sounding data and spatial mapping matrix $Q_{sounding}$. For example, a device can multiply $Q_{sounding}$ with a sounding data transmit vector. In some implementations, in the case of multiple soundings, $Q_{sounding}$ is a column wise, composite matrix. A device can determine a steering matrix $V_i$ based on information of how a sounding packet was received, e.g., comparing a signal indicative of a received sounding packet with a pre-determined signal. In some implementations, an AP computes a steering matrix for the i-th receiver based on $W_i = Q_{sounding} V_i$.

In some implementations, an AP transmits a sounding packet to a receiver. A receiver can determine wireless channel information based on the sounding packet. In some implementations, the receiver sends wireless channel information such as channel state information (CSI), information indicative of a steering matrix $V_i$, or information indicative of interference. For example, a receiver can measure CSI based on the received sounding packet.

An AP can compute steering matrices based on wireless channel information. In some implementations, a device computes:

$$H_{Total} = \begin{bmatrix} \tilde{H}_1 \\ \tilde{H}_2 \end{bmatrix} \approx \begin{bmatrix} H_1 \\ H_2 \end{bmatrix} Q_{sounding}$$

as the composed CSI feedback from two receivers. Here, $\tilde{H}_1 \approx H_1 Q_{sounding}$, $\tilde{H}_2 \approx H_2 Q_{sounding}$ are the estimations of the wireless channel matrices associated with tones of an OFDM system for the two clients respectively. $H_{Total}$ can be expanded to include wireless channel matrix estimates for additional clients.

A multiplexing matrix such as a steering matrix can include an interference mitigation component and a beam forming component. Let $V_{\bar{i}\perp}$ represent the interference mitigation of the i-th client's signal at the other clients. In some implementations, $V_{\bar{i}\perp}$ are matrices that map to the null spaces of a matrix composed by the rows in $H_{Total}$ corresponding to the channels, except the channel of the i-th client (e.g., except for $\tilde{H}_i$). In other words, $V_{\bar{i}\perp} = \text{null}(\tilde{H}_{\bar{i}})$ and $\tilde{H}_{\bar{i}} V_{\bar{i}\perp} \approx 0$. Let $V_i'$ represent the beam forming matrix specific for the i-th client. In some implementations, $V_i'$ is the per-client steering matrix for improving the performance of the equivalent channel, $\tilde{H}_i V_{\bar{i}\perp}$. In some implementations, a beam forming gain matrix such as $V_i'$ is computed via a singular value decomposition (SVD) technique. In some implementations, a steering matrix is given by $V_i = V_{\bar{i}\perp} V_i'$.

In a two client example, an AP can compute steering matrices for the clients based on $V_1 = V_{\bar{1}\perp} V_1'$ and $V_2 = V_{\bar{2}\perp} V_2'$, respectively. The AP can compute $V_{\bar{1}\perp} = \text{null}(\tilde{H}_2)$ for the first client and $V_{\bar{2}\perp} = \text{null}(\tilde{H}_1)$ for the second client. Observe that $\tilde{H}_2 V_{\bar{1}\perp} \approx 0$, $\tilde{H}_1 V_{\bar{2}\perp} \approx 0$.

In a three client example, an AP can compute steering matrices for the clients based on $V_1 = V_{\bar{1}\perp} V_1'$, $V_2 = V_{\bar{2}\perp} V_2'$, and $V_3 = V_{\bar{3}\perp} V_3'$, respectively. The AP can compute $V_{\bar{1}\perp} = \text{null}([\tilde{H}_2, \tilde{H}_3])$ for the first client. The AP can compute $V_{\bar{2}\perp} = \text{null}([\tilde{H}_1, \tilde{H}_3])$ for the second client. The AP can compute $V_{\bar{3}\perp} = \text{null}([\tilde{H}_1, \tilde{H}_2])$ for the third client. Observe that $\tilde{H}_2 V_{\bar{1}\perp} \approx 0$, $\tilde{H}_1 V_{\bar{2}\perp} \approx 0$, $\tilde{H}_3 V_{\bar{3}\perp} \approx 0$.

In some implementations, clients can determine steering matrix feedback based on wireless channel estimations performed at each client based on receiving a sounding packet from an AP. Steering matrix feedback can include a matrix. In some implementations, steering matrix feedback includes a compressed representation of a matrix. Various examples of steering feedbacks include beam forming feedback and interference rejection feedback. Based on receiving steering matrix feedback, an AP can compute an updated steering matrix $W_i$ for each client. In some implementations, some clients in a WLAN can transmit beam forming feedback, while other clients in the WLAN can transmit interference rejection feedback.

An AP can receive beam forming feedback from a client. Such feedback can include a beam forming feedback matrix $V_{i\_FB}$ from the i-th client for beam forming gain based on the wireless channel from the AP to the i-th client. A client can compute:

$$V_{i\_FB} = f_{BF}(\tilde{H}_i),$$

where $f_{BF}$ is a beam forming function. A beam forming computation can include performing a SVD computation.

The AP can compute a steering matrix for the i-th client based on:

$$W_i = Q_{sounding} V_{i\_FB}.$$

In some implementations, beam forming feedback includes a signal-to-noise-ratio (SNR) value of each spatial stream that corresponds to each column of a steering matrix feedback. In some implementations, beam forming feedback includes information associated with a Modulation Coding Scheme (MCS).

An AP can receive interference rejection feedback from a client. A client can send a feedback matrix based on a null space of an estimated wireless channel matrix, e.g., $V_{i\_FB} = \text{null}(\tilde{H}_i)$. The AP can use the feedback matrix from the i-th client for interference avoidance of the signal of the other clients to the i-th client.

In a two client example, $V_{1\_FB} = \text{null}(\tilde{H}_1)$ and $V_{2\_FB} = \text{null}(\tilde{H}_2)$. The AP can compute steering matrices for the clients based on the $V_{i\_FB}$ matrices, e.g., $W_1 = Q_{sounding} V_{2\_FB}$ and $W_2 = Q_{sounding} V_{1\_FB}$. In some cases, $V_{1\_FB}$ may map to a subspace of the space $\text{null}(\tilde{H}_1)$, e.g., less number of columns than $\text{null}(\tilde{H}_1)$. In some implementations, the number of space time streams for the second client is less than or equal to the number of columns in $V_{1\_FB}$. Likewise, the number of space time streams for the first client is less than or equal to the number of columns in $V_{2\_FB}$.

A client can receive a physical layer packet with $N_{sts\_client}$ space time streams, e.g., streams based on MCS. To feedback an interference rejection steering matrix, the client can compute a feedback steering matrix where the number of columns is equal to or less than $N_{sts\_max\_AP} - N_{sts\_client}$, where $N_{sts\_max\_Ap}$ is the maximum possible number of space-time streams that can be transmitted from the AP. In some implementations, a client can feedback a MCS suggestion together with the interference rejection steering matrix feedback. A MCS suggestion can indicate a $N_{sts\_client}$ value that is preferred by the client.

In some implementations, a client can feedback a SNR of each receive chain. In some implementations, a client can feedback a sub-stream SNR for $N_{sts\_client}$ sub-streams. In some implementations, $N_{sts\_client} = N_{sts\_max\_AP} - \text{Columns}(V_{i\_FB})$, where $\text{Columns}(V_{i\_FB})$ represents the number of columns of $V_{i\_FB}$.

In some implementations, an AP can perform one or more MAC information element (IE) exchanges when establishing a SDMA TxOP so that each client knows the maximum possible $N_{sts\_client}$ for the other clients. A client can determine the number of columns in the client's feedback $V_{i\_FB}$ based on the exchanges.

In some implementations, an AP sends sounding request packets to clients that cause the clients to send sounding packets from which the AP can estimate wireless channel information. The AP can compute wireless channel matrices $\tilde{H}_i^T$ for the wireless channels between the clients and the AP. In some implementations, a $H_{Total}$ matrix can include two or more $\tilde{H}_i^T$ matrices. The AP can compute the steering matrices $V_i$ based on the $H_{Total}$ matrix.

Figure 1B:
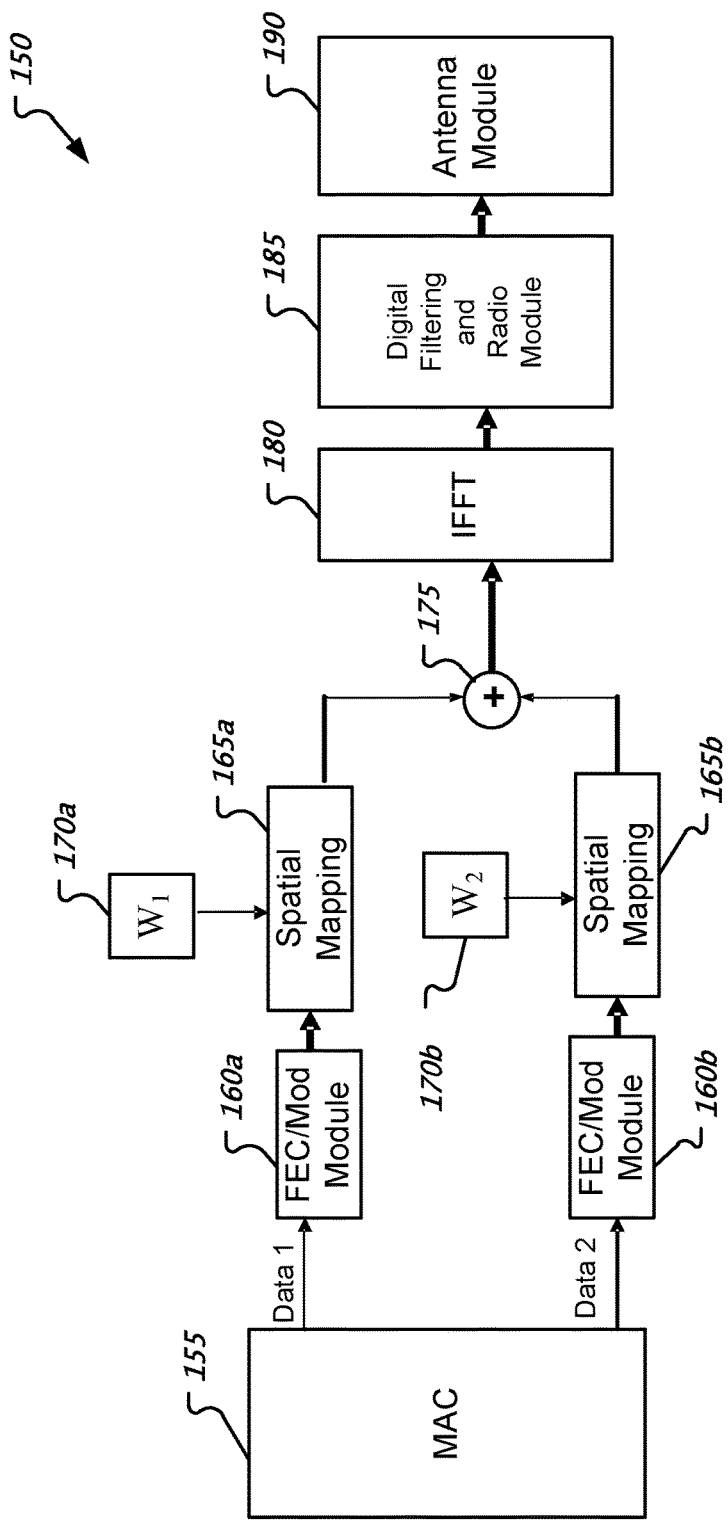
FIG. 1B shows an example of a wireless communication device architecture.

FIG. 1B shows an example of a wireless communication device architecture. A wireless communication device 150 can produce signals for different clients that are spatially separated by respective multiplexing matrices $W_i$, e.g., steering matrices. Each $W_i$ is associated with a subspace. A wireless communication device 150 includes a MAC module 155. The MAC module 155 can include one or more MAC control units (MCUs) (not shown). The wireless communication device 150 includes two or more modules 160a, 160b that receive data streams from the MAC module

155 which are associated with different clients. The two or more modules 160a, 160b can perform encoding such as a forward error correction (FEC) encoding technique and modulation on a data stream. The two or more modules 160a, 160b respectively are coupled with two or more spatial mapping modules 165a, 165b.

The spatial mapping modules 165a, 165b can access a memory 170a, 170b to retrieve a spatial multiplexing matrix associated with a data stream's intended client. In some implementations, the spatial mapping modules 165a, 165b access the same memory, but at different offsets to retrieve different matrices. An adder 175 can sum outputs from the spatial mapping modules 165a, 165b.

An Inverse Fast Fourier Transform (IFFT) module 180 can perform an IFFT on an output of the adder 175 to produce a time domain signal. A digital filtering and radio module 185 can filter the time domain signal and amplify the signal for transmission via an antenna module 190. An antenna module 190 can include multiple transmit antennas and multiple receive antennas. In some implementations, an antenna module 190 is a detachable unit that is external to a wireless communication device 150.

In some implementations, a wireless communication device 150 includes one or more integrated circuits (ICs). In some implementations, a MAC module 155 includes one or more ICs. In some implementations, a wireless communication device 150 includes an IC that implements the functionality of multiple units and/or modules such as a MAC module, MCU, BBU, or RFU. In some implementations, a wireless communication device 150 includes a host processor that provides a data stream to a MAC module 155 for transmission. In some implementations, a wireless communication device 150 includes a host processor that receives a data stream from the MAC module 155. In some implementations, a host processor includes a MAC module 155.

Figure 2:
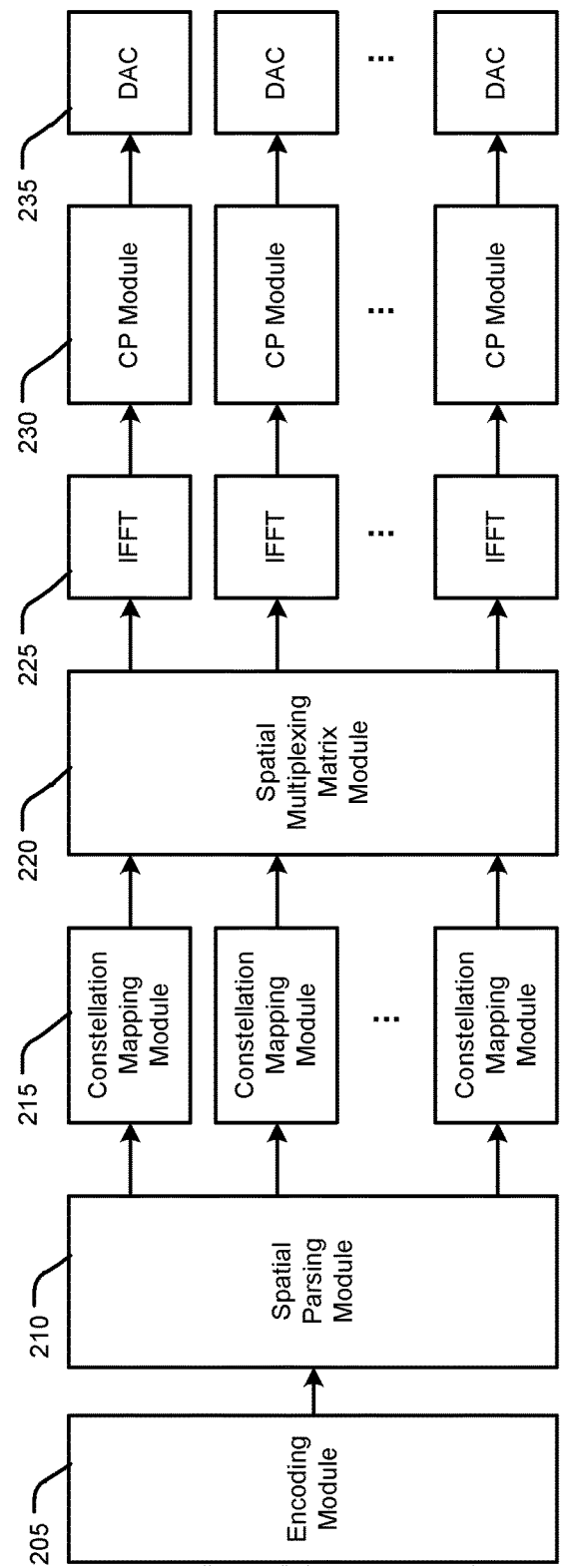
FIG. 2 shows an example of a functional block diagram of a transmit path of wireless communication device.

FIG. 2 shows an example of a functional block diagram of a transmit path of wireless communication device. In this example, a transmit path is configured for MIMO communications. A wireless communication device such as an AP can include one or more transmit paths. An AP's transmit path can include an encoding module 205 configured to receive a data steam, such as an audio data stream, a video data stream, or combination thereof. The encoding module 205 outputs encoded bit streams to a spatial parsing module 210, which performs spatial mapping to produce multiple outputs.

Outputs of the spatial parsing module 210 are input into constellation mapping modules 215, respectively. In some implementations, a constellation mapping module 215 includes a serial-to-parallel converter that converts an incoming serial stream to multiple parallel streams. The constellation mapping module 215 can perform quadrature amplitude modulation (QAM) on multiple streams produced by a serial-to-parallel conversion. The constellation mapping module 215 can output OFDM tones that are input to a spatial multiplexing matrix module 220. The spatial multiplexing matrix module 220 can multiply the OFDM tones by a spatial multiplexing matrix to produce signal data for multiple transmit antennas.

Outputs of the spatial multiplexing matrix module 220 are input to Inverse Fast Fourier Transform (IFFT) modules 225. Outputs of the IFFT modules 225 are input to cyclic prefix (CP) modules 230. Outputs of the CP modules 230 are input to digital-to-analog converters (DACs) 235, which produce analog signals for transmission on multiple transmit antennas, respectively.

Figure 3:
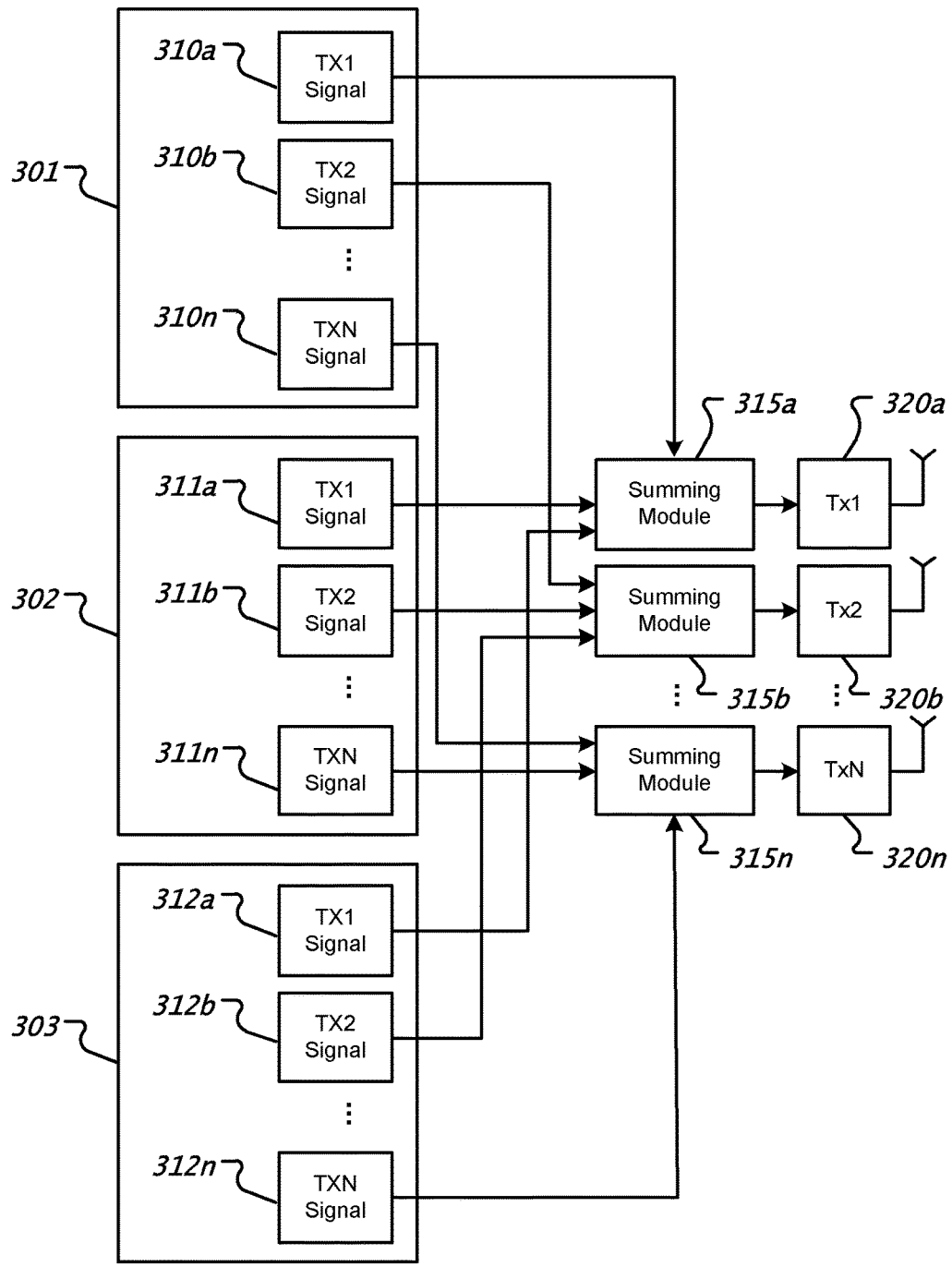
FIG. 3 shows an example of an architecture that combines multiple transmission signals for transmission on multiple antennas.

FIG. 3 shows an example of an architecture that combines multiple transmission signals for transmission on multiple antennas. A transmitter can include two or more transmit paths 301, 302, 303 that are each configured for MIMO communications. A first transmit path 301 generates multiple transmit signals 310a, 310b, 310n for transmission on multiple transmit antennas 320a, 320b, 320n, respectively. A second transmit path 302 generates multiple transmit signals 311a, 311b, 311n for transmission on multiple transmit antennas 320a, 320b, 320n, respectively. A third transmit path 303 generates multiple transmit signals 312a, 312b, 312n, for transmission on multiple transmit antennas 320a, 320b, 320n, respectively.

A transmitter can include multiple summing modules 315a, 315b, 315n that are associated with multiple transmit antennas 320a, 320b, 320n, respectively. In some implementations, summing modules 315a, 315b, 315n sum corresponding outputs of DACs in each of the transmit paths 301, 302, 303 to produce combined transmit signals for each of antennas 320a, 320b, 320n.

Figure 4:
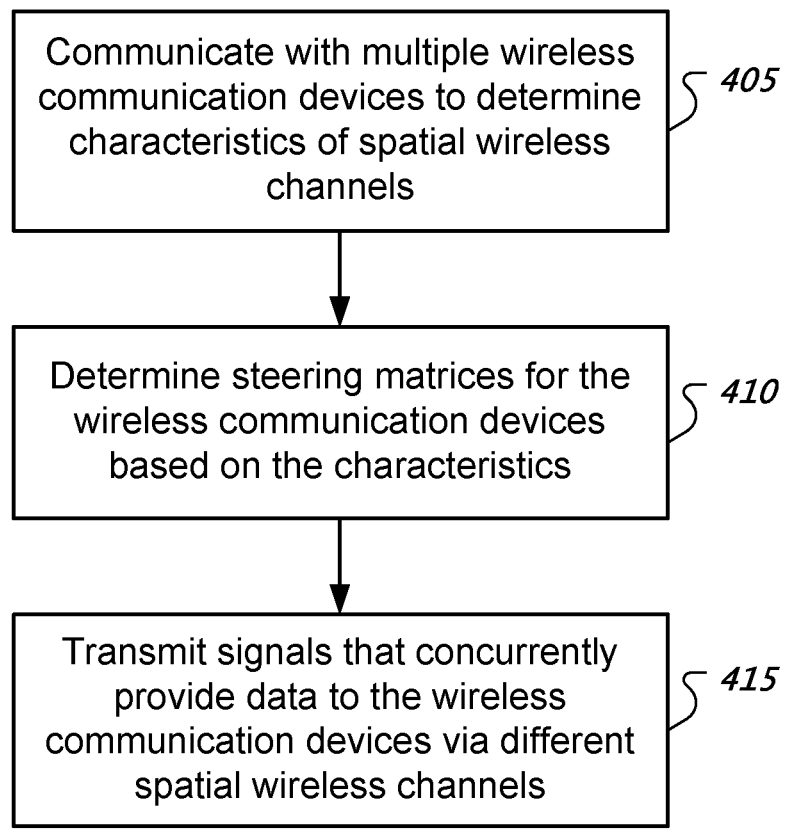
FIG. 4 shows an example of a communication process.

FIG. 4 shows an example of a communication process. At 405, a communication process includes communicating with multiple wireless communication devices to determine characteristics of spatial wireless channels. The spatial wireless channels are respectively associated with the wireless communication devices. Communicating with multiple wireless communication devices can include using a sounding technique such as an explicit sounding technique or an implicit sounding technique. At 410, the communication process includes determining steering matrices for the wireless communication devices based on the characteristics. The steering matrices are respectively associated with the wireless communication devices. In explicit sounding, an AP can use feedback received from the wireless communication devices to determine the steering matrices. In implicit sounding, an AP receives sounding packets from which the AP can determine steering matrices. At 415, the communication process includes transmitting signals that concurrently provide data to the wireless communication devices via different spatial wireless channels. The signals can be spatially steered to the wireless communication devices based on the steering matrices.

Figure 5:
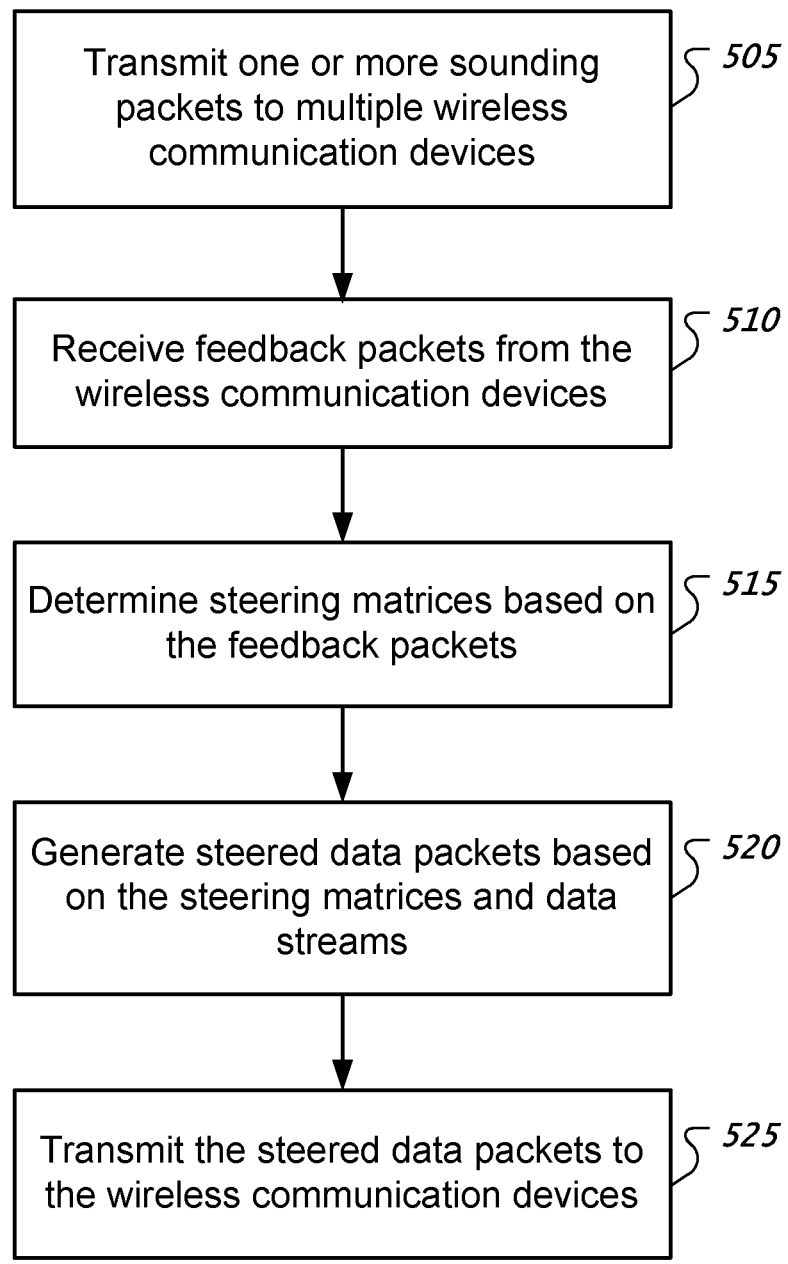
FIG. 5 shows an example of an explicit sounding communication process.

FIG. 5 shows an example of an explicit sounding communication process. A wireless communication device can use an explicit sounding communication process to sound antennas. At 505, the transmitter transmits one or more sounding packets to multiple wireless communication devices. A sounding packet can include signals based on pre-defined reference signals. A sounding packet can include different segments for sounding at different clients. In some implementations, a transmitter transmits separate sounding packets for each of the clients. In some implementations, a transmitter can multicast a sounding packet to multiple clients. In some implementations, a transmitter can generate an aggregated data unit that includes a data unit for each client in the WLAN. For example, an aggregated data unit can include a first data unit with sounding data for a first client and a second data unit with sounding data for a second client.

At 510, the transmitter receives feedback packets from the wireless communication devices. A feedback packet can include information that is derived from a wireless channel estimation that is based on a received sounding packet. In some implementations, a feedback packet includes channel state information (CSI). In some implementations, a feedback packet includes beam forming feedback information such as a steering matrix. In some implementations, a feedback packet includes interference feedback information such as an interference feedback matrix. Data that comprise a matrix can be compressed for transmission.

At 515, the transmitter determines steering matrices based on the feedback packets. Determining steering matrices can include estimating wireless channel matrices based on feedback from the devices. Determining steering matrices can include using feedback matrices to determine steering matrices. At 520, the transmitter generates steered data packets based on the steering matrices and data streams. At 525, the transmitter transmits the steered data packets to the wireless communication devices.

FIG. 6A shows an example of an explicit sounding timing diagram. An AP transmits a sounding packet 605 to two or more receivers. In some implementations, an AP can use multicast to transmit a sounding packet to multiple receivers. In some implementations, a sounding packet includes information to coordinate the timing of when receivers send feedback packets. For example, MAC layer data can indicate an ordering of the feedback packets.

Receivers can determine wireless channel information based on a reception of the sounding packet 605. For example, a first receiver transmits a feedback packet 610 to the AP based on the first receiver's reception of the sounding packet 605. In a different time slot, a second receiver transmits a feedback packet 615 to the AP based on the second receiver's reception of the sounding packet 605. The AP can create one or more protected time periods (TxOPs) in which to send and receive sounding and feedback information.

The AP can determine steering matrices for the receives based on the feedback packets. In some implementations, a feedback packet can include wireless channel information. AP transmits a SDMA frame 620 that includes steered data packets for respective receivers.

FIG. 6B shows another example of an explicit sounding timing diagram. In this example, an AP sends separate sounding packets. The AP transmits a sounding packet 655 to a first receiver. In response, the first receiver transmits a feedback packet 660 to the AP. The AP transmits a sounding packet 665 to a second receiver. In response, the second receiver transmits a feedback packet 670 to the AP. In some implementations, the AP creates separate TxOPs for each of the AP's sounding exchanges. The AP can determine steering matrices for the receives based on the feedback packets. The AP transmits a SDMA frame 675 that includes steered data packets for respective receivers.

Figure 7:
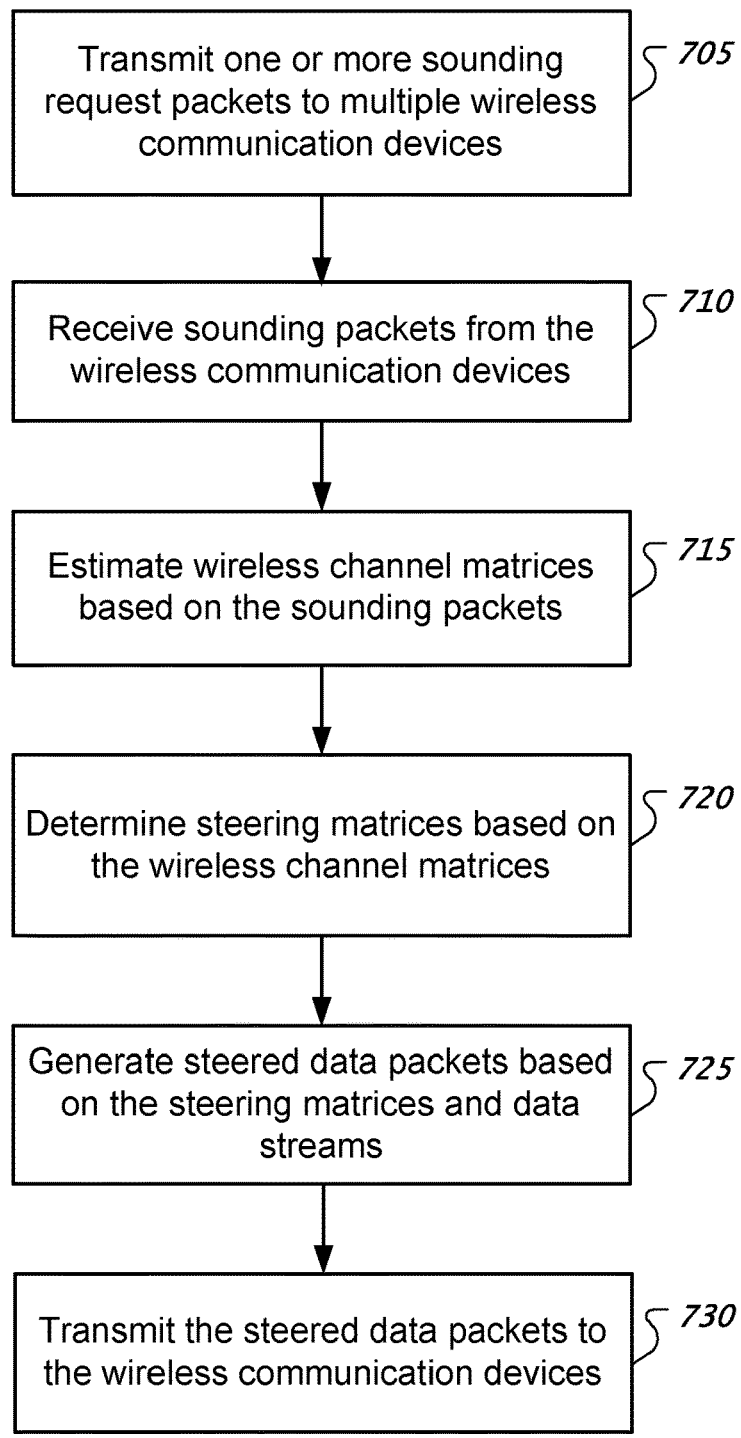
FIG. 7 shows an example of an implicit sounding communication process.

FIG. 7 shows an example of an implicit sounding communication process. A wireless communication device can use an implicit sounding communication process to sound antennas. In this example, a transmitter solicits sounding packets from two or more receivers. At 705, the transmitter transmits one or more sounding request packets to multiple wireless communication devices. A sounding request packet can cause a receiver to transmit a sounding packet. A sounding request packet can include different segments addressed to different receivers. In some implementations, a transmitter can multicast a sounding request packet to multiple clients. In some implementations, a transmitter can generate an aggregated data unit that includes a data unit for each client in the WLAN. For example, an aggregated data unit can include a first data unit with a sounding request for a first client and a second data unit with a sounding request for a second client. In some implementations, a transmitter transmits separate sounding request packets for each of the receivers.

At 710, the transmitter receives sounding packets from the wireless communication devices. In some implementations, the received sounding packets can be sent in the same TxOP as the sounding request packet. In some implementations, a device can create a TxOP to transmit a sounding packet. At 715, the transmitter estimates wireless channel matrices based on the sounding packets. At 720, the transmitter determines steering matrices based on the wireless channel matrices. At 725, the transmitter generates steered data packets based on the steering matrices and data streams. At 730, the transmitter transmits the steered data packets to the wireless communication devices. In some implementations, the transmitter performs calibration for phase shifts and/or amplitudes changes in one or more wireless channels.

FIG. 8A shows an example of an implicit sounding timing diagram. An AP transmits a sounding request packet 805 to two or more receivers. A sounding request packet 805 can include a Training Request (TRQ) field set to indicate that one or more sounding packets are requests from a receiver. In some implementations, an AP can use multicast to transmit a sounding request packet to multiple receivers. In some implementations, a sounding request packet includes information to coordinate the timing of when receivers send sounding packets. For example, MAC layer data can indicate an ordering of the sounding packets.

A first receiver transmits a sounding packet 810 to the AP. In a subsequent time slot, a second receiver transmits a sounding packet 815 to the AP. The AP receives the sounding packets. The AP can determine wireless channel information based on the received version of the sounding packets and pre-determined sound packet data. The AP can determine steering matrices for the receives based on the wireless channel information. The AP transmits a SDMA frame 820 that includes steered data packets for respective receivers.

FIG. 8B shows another example of an implicit sounding timing diagram. In this example, an AP sends separate sounding request packets. The AP transmits a sounding request packet 855 to a first receiver. In response, the first receiver transmits a sounding packet 860 to the AP. The AP transmits a sounding request 865 packet to a second receiver. In response, the second receiver transmits a sounding packet 870 to the AP. In some implementations, the AP creates separate TxOPs for each of the AP's sounding exchanges with the receivers.

The AP can determine wireless channel information based on the received version of the sounding packets and pre-determined sound packet data. The AP can determine steering matrices for the receives based on the wireless channel information. The AP transmits a SDMA frame 875 that includes steered data packets for respective receivers.

A wireless communication device can send sounding packets to sound one or more antennas. Sounding antennas can include determining wireless channel information. A MAC frame format for a sounding packet can include a field such as a HT-Control field or a VHT-Control field to signal the type of wireless channel information, e.g., CSI feedback, non-compressed steering matrix feedback, or compressed steering matrix feedback, that is requested.

A wireless communication device such as an AP or a client can perform sounding via transmitting sounding packets. Various examples of sounding packets include staggered sounding packets and null data packet (NDP) based sounding packets.

FIG. 9A shows an example of a staggered sounding packet. A wireless communication device can generate a staggered sounding packet 905. The sounding packet 905 can include a Legacy Short Training Field (L-STF), Legacy Long Training Field (L-LTF), and Legacy Signal Field (L-SIG). The sounding packet 905 can include one or more Very High Throughput (VHT) fields such as VHT Signal Field (VHT-SIG), VHT Short Training Field (VHT-STF), VHT Long Training Field (HT-LTF). The sounding packet 905 can include Extended Long Training Fields (E-LTFs). For example, a sounding packet 905 can include an E-LTF for each TX antenna to be sounded. In some implementations, subfield combinations in VHT-SIG fields can signal the number of E-LTFs in the sounding packet 905.

FIG. 9B shows another example of a staggered sounding packet. A staggered sounding packet 910 can include one or more of L-STF, L-LTF, and L-SIG. The sounding packet 910 can include one or more High Throughput (HT) fields such as HT Signal Field (HT-SIG) to signal that a VHT-SIG field is included in the sound packet 905. In this example, the VHT-SIG field is transmitted with a 90-degrees phase shift for Binary phase-shift keying (BPSK) modulation in each OFDM tone. In some implementations, an AP can rotate the VHT-SIG BPSK modulation constellation points in each subcarrier to the imaginary axis. The sounding packet 910 includes an E-LTF for each TX antenna to be sounded. The VHT-SIG field can include a sub-field that indicatives the number of E-LTFs in the sounding packet 910.

FIG. 9C shows an example of a null data packet based sounding packet. A wireless communication device can generate a NDP based sounding packet 915. The sounding packet 915 can include one or more of L-STF, L-LTF, and L-SIG. The sounding packet 915 can include one or more VHT fields such as VHT-SIG1 and VHT-SIG2, VHT-STF, and multiple VHT-LTFs. Signaling fields in the sounding packet 915 such as VHT-SIG1 and VHT-SIG2 can be used to indicate the number of included VHT-LTFs. The sounding packet 915 includes a VHT-LTF for each TX antenna to be sounded. The VHT-LTFs can be used to determine a wireless channel matrix.

FIG. 9D shows another example of a null data packet based sounding packet. A null data packet based sounding packet 920 can include one or more of L-STF, L-LTF, and L-SIG. The sounding packet 920 can include signaling fields such as HT-SIG1 and HT-SIG2 fields to signal that a VHT-SIG field is included in the sound packet 920. In this example, the VHT-SIG field is transmitted with a 90-degrees phase shift for BPSK modulation in each OFDM tone. In some implementations, an AP can rotate the VHT-SIG BPSK modulation constellation points in each subcarrier to the imaginary axis. The sounding packet 920 includes an E-LTF for each TX antenna to be sounded. The VHT-SIG field can include a sub-field that indicates the number of E-LTFs in the sounding packet 920.

The number of TX antennas to be sounded can be greater than four at an AP. In some implementations, a sounding technique based on a wireless standard such as IEEE 802.11n can be extended to accommodate wireless devices with more than 4 antennas. For example, a sounding technique can sound 8 TX antennas of an AP. In some implementations, an AP can use a burst of consecutive sounding packets to sound multiple TX antennas. For example, if there are eight TX antennas at an AP, the AP can send two consecutive sounding packets, where each packet sounds four TX antennas at a time.

Figure 9E:
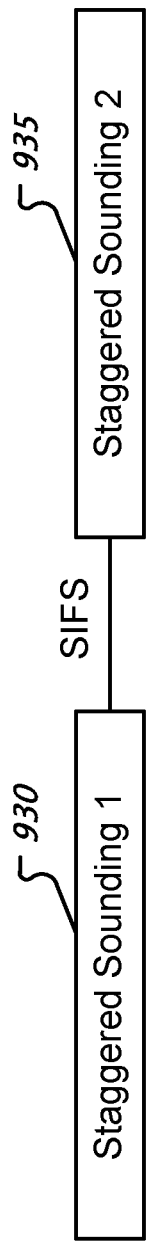
FIG. 9E shows an example of transmitting consecutive staggered sounding packets to sound multiple antennas.

FIG. 9E shows an example of transmitting consecutive staggered sounding packets to sound multiple antennas. In this example, an AP includes eight TX antennas. A first staggered sounding packet 930 can sound a set of four TX antennas at the AP. A second staggered sounding packet 935 can sound the remaining set of four TX antennas at the AP. A Short Inter-Frame Space (SIFS) separates the first staggered sounding packet 930 from the second staggered sounding packet 935 in time. In some implementations, a MAC layer information associated with the first staggered sounding packet 930 can indicate that a sound sounding packet will follow.

Figure 9F:
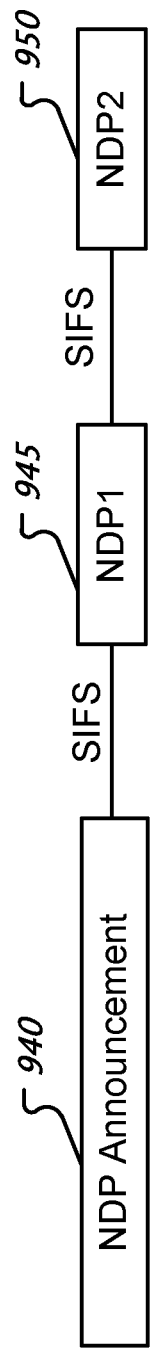
FIG. 9F shows an example of transmitting consecutive null data packet based sounding packets to sound multiple antennas.

FIG. 9F shows an example of transmitting consecutive null data packet based sounding packets to sound multiple antennas. In this example, an AP includes eight TX antennas. An AP can send a NDP Announcement packet 940 to indicate that two or more NDP based sounding packets will be transmitted. A first NDP packet 945 can sound a set of four TX antennas at the AP. A second NDP packet 950 can sound the remaining set of four TX antennas at the AP. A SIFS separates the packets 940, 945, 950 in time.

A wireless communication device can support both single client and multi-client communications. For example, a wireless communication device based on a wireless standard such as IEEE 802.11n can support legacy mode communications with a single wireless communication device. For example, a transmitter can transmit signaling information that causes legacy devices to ignore processing a multi-client SDMA frame and to prevent a legacy device from transmitting during a transmission of a multi-client SDMA frame. A multi-client SDMA frame can include data for different clients in respective spatial wireless channels.

A wireless communication device can generate and transmit signaling information that indicates that a frame is a multi-client SDMA frame. A wireless communication device can transmit, in a SDMA frame, two or more PHY frames over two or more wireless channels to two or more clients. In some implementations, the PHY frame durations are not required to be identical. In some implementations, a client sets a Clear Channel Assessment (CCA) duration based on the longer PHY frame duration in a SDMA frame.

FIG. 10A shows an example of a space division multiple access based frame. A wireless communication device can generate a SDMA frame 1001 based on an IEEE 802.11n Mixed-Mode. A SDMA frame 1001 can include first and second segments 1005, 1010. The first segment 1005 is omni-directional, e.g., it is not steered. The second segment 1010 includes a first PHY frame 1015 steered to a first client associated with a first subspace and a second PHY frame 1020 steered to a second client associated with a second subspace. The first segment 1005 includes L-STF, L-LTF, and L-SIG. The PHY frames 1015, 1020 include VHT-SIG, VHT-STF, and one or more VHT-LTFs and VHT-Data. The number of included VHT-LTFs can vary per client. The length of VHT-Data can vary per client.

In some implementations, a wireless communication device can set a bit in a L-SIG in the first segment 1005 to indicate a presence of a SDMA frame to a receiver. In some implementations, a wireless communication device can set a bit in one or more VHT-SIGs in the second segment 1010 to indicate a presence of a SDMA frame.

In some implementations, a wireless communication device can set a reserved bit associated with a wireless communication standard such as IEEE 802.11n in an L-SIG field of the PHY frames 1015, 1020 to 1 to indicate a presence of a SDMA frame to a receiver. In some implementations, the wireless communication device can include length and rate data in the L-SIG field of the first segment 1005. The length and rate data can be based on the second segment 1010 of the SDMA frame 1001. In some implementations, a receiver of the SDMA frame 1001 can set a CCA duration based on a computation using length and rate subfields in an L-SIG.

FIG. 10B shows another example of a space division multiple access based frame. A SDMA frame 1051 can include first and second segments 1055, 1060. The first segment 1055 is omni-directional and includes L-STF, L-LTF, L-SIG, VHT-SIG1, and VHT-SIG2. VHT-SIG1 and VHT-SIG2 contain information for clients listening on a WLAN. VHT-SIG1 and VHT-SIG2 can include a subfield to indicate the presence of a VHT signaling fields in a steered portion of the SDMA frame 1051. The second segment 1060 includes steered PHY frames, e.g., a first PHY frame 1065 steered to a first client associated with a first subspace and a second PHY frame 1070 steered to a second client associated with a second subspace. The PHY frames 1065, 1070 include VHT-STF, VHT-LTF, VHT-SIG1, VHT-SIG2, and VHT-Data. PHY frames 1065, 1070 fields such as VHT-SIG1 and VHT-SIG2 can signal how many additional VHT-LTFs remain in a PHY frame 1065, 1070 for a specific receiver.

Figure 11:
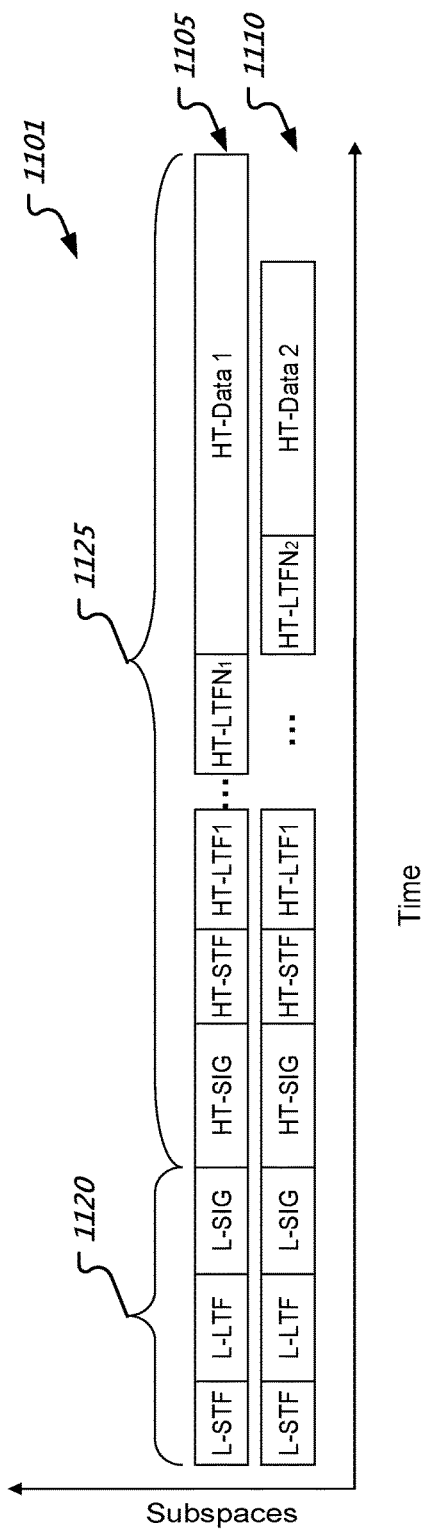
FIG. 11 shows another example of a space division multiple access based frame.

FIG. 11 shows another example of a space division multiple access based frame. A SDMA frame 1101 can include first and second PHY frames 1105, 1110 that are partitioned into first and second segments 1120, 1125. The first and second PHY frames 1105, 1110 are steered towards different clients. In the first segment 1120, the PHY frames 1105, 1110 have identical data, e.g., identical L-STF, L-LTF, and L-SIG. However, in the first segment 1120, the AP performs steering for each of the clients by using one column of a corresponding steering matrix. In the second segment 1125, the PHY frames 1105, 1110 include HT-SIG, HT-STF, multiple HT-LFTs, and HT-Data. The number of included HT-LTFs can vary per client. The length of HT-Data can vary per client. In the second segment 1125, the AP performs steering for each of the clients by using all of the columns of a corresponding steering matrix.

The PHY frames 1105, 1110 can be operated based on one or more FFT bandwidth frequencies, e.g., 20 MHz, 40 MHz, or 80 MHz. In some implementations, different PHY frames 1105, 1110 can use different bandwidth frequencies in the same SDMA frame 1101. In some implementations, if one subspace is operated at 40 MHz in the second segment 1125, then a subspace associated with the first segment 1120 is operated at 20 MHz with its information content duplicated at upper and lower 20 MHz halves, where the upper tones have a 90 degree phase shift relative to the lower tones.

Figure 12:
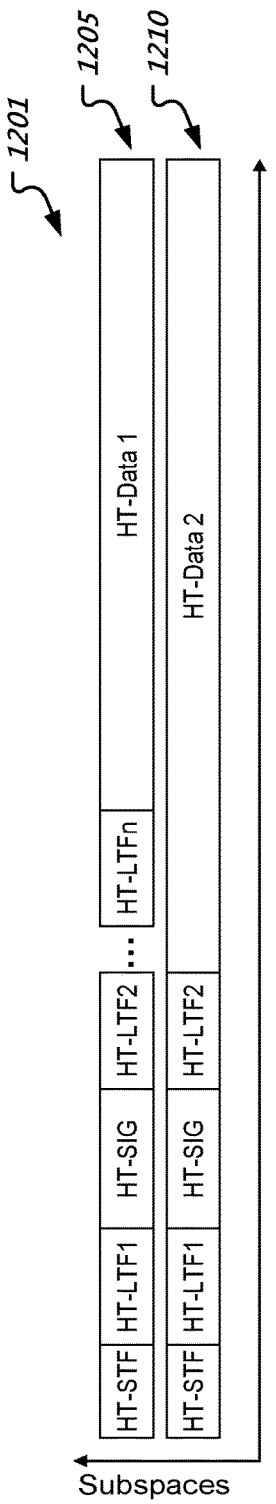
FIG. 12 shows another example of a space division multiple access based frame.

FIG. 12 shows another example of a space division multiple access based frame. A wireless communication device can generate a SDMA frame 1201 based on an IEEE 802.11n Greenfield Mode. A SDMA frame 1201 can include first and second PHY frames 1205, 1210. In this example, the PHY frames 1205, 1210 are steered for respective clients using all of the columns of the corresponding steering matrices.

The PHY frames 1205, 1210 can include HT-STF, HT-LTF, HT-SIG, and HT-Data fields. The PHY frames 1205, 1210 can include signaling to indicate that one or more additional HT-LTFs are included. In some implementations, a wireless communication device can set a bit in a HT-SIG field to indicate a presence of a SDMA frame to a client. A wireless communication device can include padding, if required, to generate equal duration PHY frames 1205, 1210. For example, a device can include zero-byte padding after the end of a HT-Data field to generate a PHY frame that is equal in length to another PHY frame, of a SDMA frame, that includes a longer HT-Data field.

The sounding frame format and the SDMA frame format can vary. The sounding and feedback techniques presented herein can be combined with a variety of frame formats, e.g., preamble formats, applied for a wireless communication system, e.g., such as one based on IEEE 802.11 ac.

In some implementations, SDMA devices are operated to be compatible with legacy devices such as legacy IEEE 802.11n based devices or legacy IEEE 802.11a based devices. In some implementations, a SDMA frame format is compatible with such legacy devices. For example, a legacy device can detect and/or disregard a SDMA frame transmitted in the legacy device's operating frequency band. In some implementations, SDMA devices can create a protected time period (TxOP) during which SDMA frame transmissions are conducted. Such SDMA devices can use a MAC mechanism to reserve time for transmission of SDMA frames.

Acknowledgement (ACK) packets can be transmitted by client SDMA devices during a TxOP. In some cases, a negative ACK (NAK) can be transmitted to indicate a failure. If an ACK is required for a SDMA frame, the receiving device can send an ACK after a SIFS, which starts after the end of a SDMA frame. In some implementations, a wireless communication device aggregates acknowledgement information and transmits a block ACK based on a pre-determined number of SDMA frames.

Figure 13:
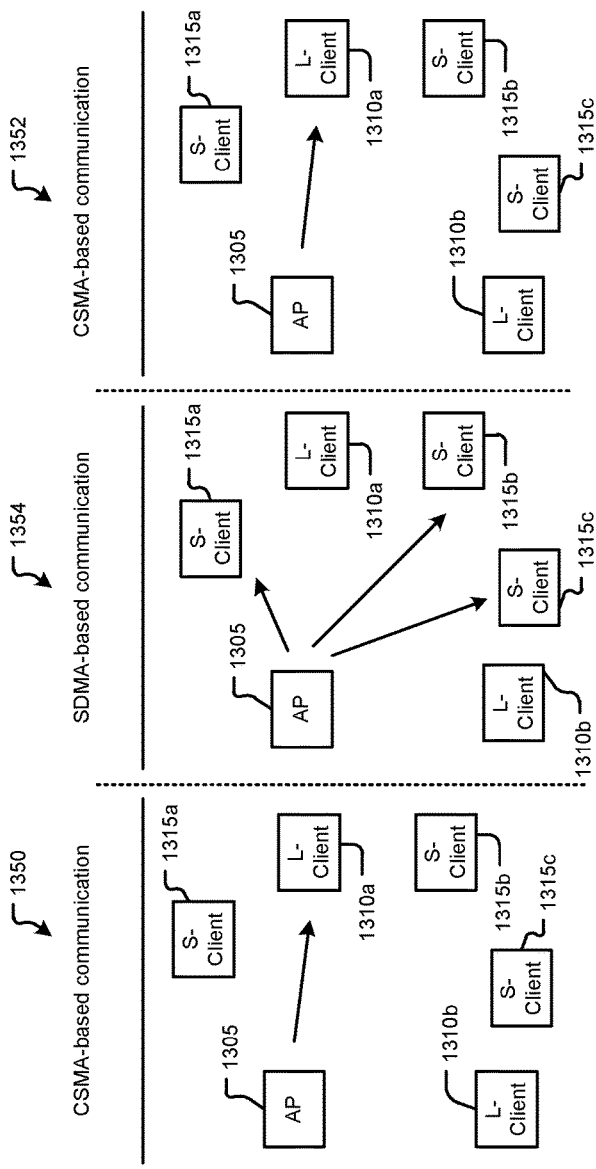
FIG. 13 shows an example of a timing diagram that includes windows for carrier sense based communications and a window for space division based communications.

FIG. 13 shows an example of a timing diagram that includes windows for carrier sense based communications and a window for space division based communications. An AP 1305 can transmit or receive data to/from legacy clients 1310a, 1310b during legacy windows 1350, 1352 for CSMA-based communications. During a window 1354 for SDMA based communications, the AP 1305 sends steered data to SDMA enabled clients 1315a, 1315b, 1315c and then receives acknowledgements from the SDMA enabled clients 1315a, 1315b, 1315c. During the SDMA window 1354, legacy clients 1310a, 1310b can be prohibited from transmitting data. Time sufficient for the SDMA window 1354 can be arranged with the legacy client stations 1310a, 1310b using a MAC mechanism.

Figure 14:
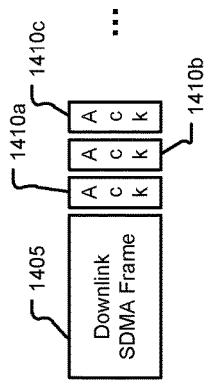
FIG. 14 shows an example of a timing diagram including a space division multiple access based frame and uplink acknowledgments.

FIG. 14 shows an example of a timing diagram including a downlink SDMA frame and uplink acknowledgments. An AP can transmit data to different clients in a SDMA frame 1405. ACKs 1410a, 1410b, 1410c can be transmitted after the SDMA frame 1405 based on a fixed schedule, e.g., using a time slot based approach. Allocation of the time slots can be performed by the AP. In some implementations, a SDMA frame 1405 can include a MAC IE in each of the signals transmitted in the corresponding subspaces to indicate the ordering of when each client can send an ACK or NAK. However, the allocation of time for ACKs can be distributed using other approaches and/or at other times. A SIFS can separate the SDMA frame 1405 and the ACKs 1410a, 1410b, 1410c.

Figure 15:
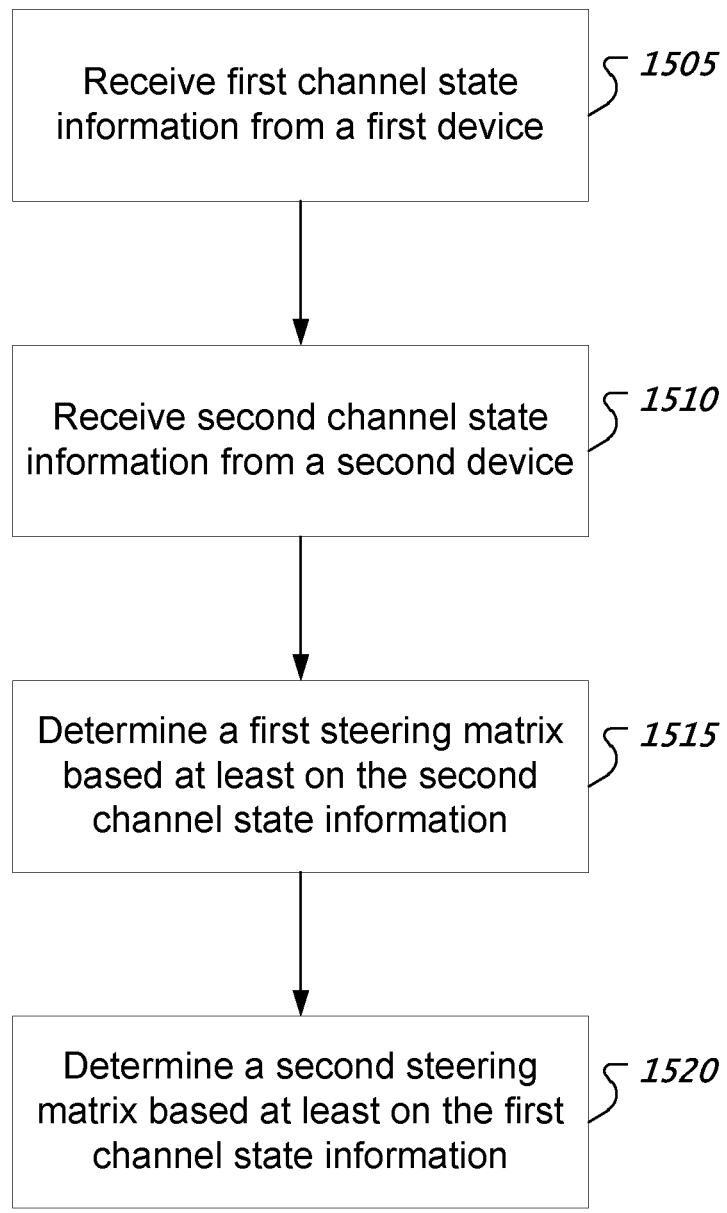
FIG. 15 shows an example of a communication process based on channel state information.

FIG. 15 shows an example of a communication process based on channel state information. A communication process can use channel state information to determine steering matrices. The process can use explicit sounding to receive feedback information from two or more devices. Two client devices are described in this example, however, the techniques illustrated by this example are readily extendable to more than two devices.

At 1505, a communication process receives first channel state information from a first device. At 1510, the communication process receives second channel state information from a second device. At 1515, the communication process determines a first steering matrix based at least on the second channel state information. At 1520, the communication process determines a second steering matrix based at least on the first channel state information. In some implementations, a communication process can use implicit sounding. For example, a transmitter can determine channel state information based on received sounding packets from multiple devices.

Figure 16:
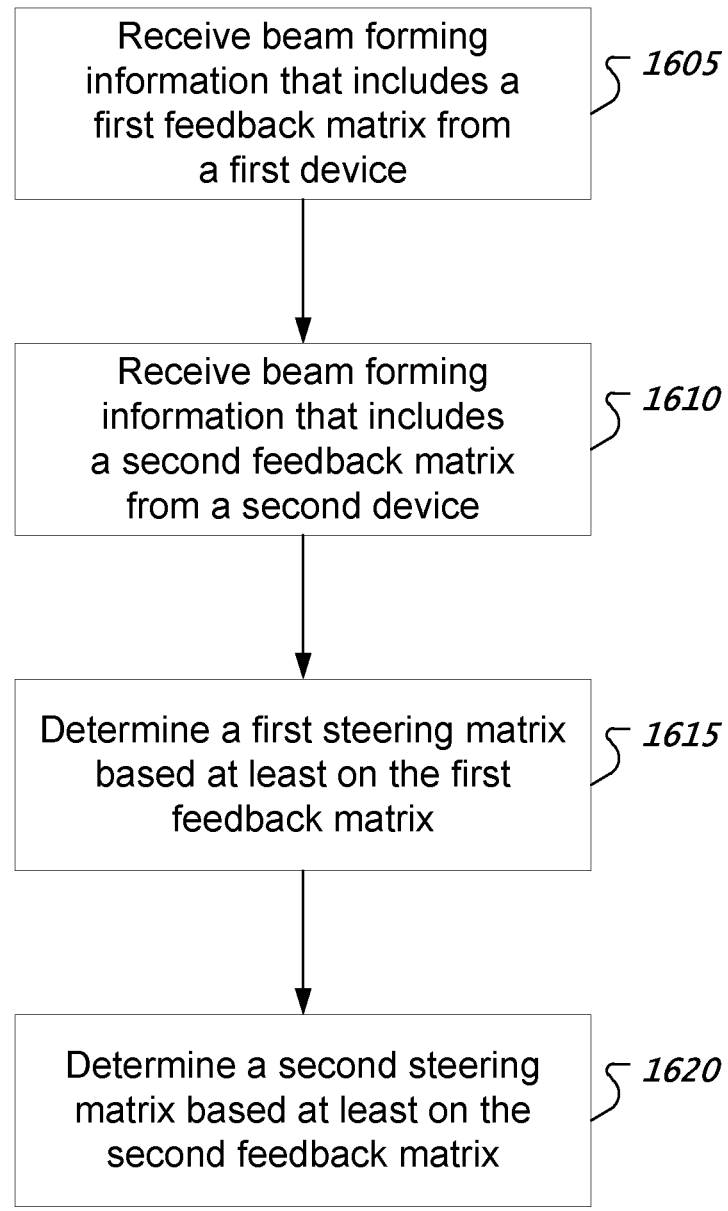
FIG. 16 shows an example of a communication process based on beam forming feedback.

FIG. 16 shows an example of a communication process based on beam forming feedback. A communication process can use beam forming feedback information, such as beam forming feedback matrices, to determine steering matrices. The process can use explicit sounding to receive feedback information from two or more devices. Two client devices are described in this example, however, the techniques illustrated by this example are readily extendable to more than two devices.

At 1605, a communication process receives beam forming information that includes a first feedback matrix from a first device. At 1610, the communication process receives beam forming information that includes a second feedback matrix from a second device. At 1615, the communication process determines a first steering matrix based at least on the first feedback matrix. At 1620, the communication process determines a second steering matrix based at least on the second feedback matrix.

Figure 17:
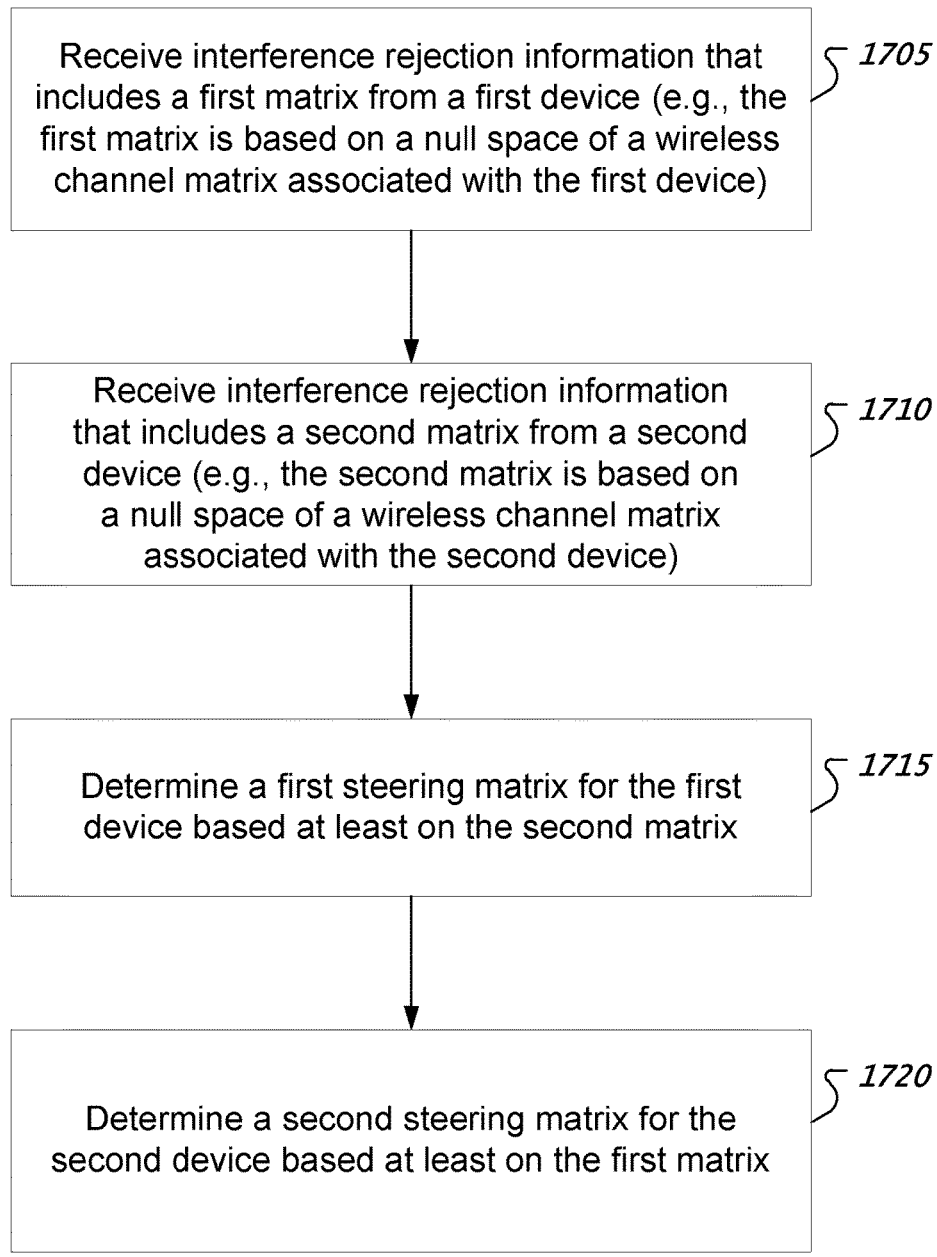
FIG. 17 shows an example of a communication process based on interference feedback.

FIG. 17 shows an example of a communication process based on interference feedback. A communication process can use interference feedback information, such as interference feedback matrices, to determine steering matrices. The process can use explicit sounding to receive feedback information from two or more devices. Two client devices are described in this example, however, the techniques illustrated by this example are readily extendable to more than two devices.

At 1705, a communication process receives interference rejection information that includes a first matrix from a first device. In some implementations, the first matrix is based on a null space of a wireless channel matrix associated with the first device. At 1710, the communication process receives interference rejection information that includes a second matrix from a second device. In some implementations, the second matrix is based on a null space of a wireless channel matrix associated with the second device. At 1715, the communication process determines a first steering matrix for the first device based at least on the second matrix. At 1720, the communication process determines a second steering matrix for the second device based at least on the first matrix.

The techniques and packet formats described herein can be compatible with various packet formats defined for various corresponding wireless systems such as one based on IEEE 802.11ac. For example, various wireless systems can be adapted with the techniques and systems described herein to include signaling related to sounding via multiple clients and signaling of a SDMA frame.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:
1. A method comprising:
  transmitting a sounding packet to wireless communication devices;
  receiving, in response to the sounding packet, feedback packets from the wireless communication devices, wherein the feedback packets collectively comprise beamforming feedback, the beamforming feedback being derived from received versions of the sounding packet;
  determining a steering matrix based on the beamforming feedback; and transmitting, within a frame, spatially steered data packets to the wireless communications devices,
wherein the spatially steered data packets are based on the steering matrix and data streams intended respectively for the wireless communication devices,
wherein the spatially steered data packets concurrently provide the data streams respectively within the frame to the wireless communication devices via different spatial wireless channels.

2. The method of claim 1, wherein the beamforming feedback respectively comprise compressed versions of beamforming matrices, the compressed versions of beamforming matrices being derived from the received versions of the sounding packet.

3. The method of claim 1, wherein determining the steering matrix comprises using a spatial mapping matrix, and wherein the sounding packet is based on the spatial mapping matrix.

4. The method of claim 1, wherein transmitting the sounding packet comprises transmitting a null data packet (NDP).

5. The method of claim 4, comprising:
transmitting a NDP announcement packet to indicate that the NDP will be transmitted.

6. The method of claim 1, wherein the sounding packet comprises training fields.

7. The method of claim 6, wherein a quantity of the training fields is included in a signal field of the sounding packet.

8. An apparatus comprising:
transceiver electronics to communicate with wireless communication devices; and
processor electronics coupled with the transceiver electronics and configured to
control a transmission of a sounding packet to the wireless communication devices,
receive, in response to the sounding packet, feedback packets from the wireless communication devices, wherein the feedback packets collectively comprise beamforming feedback, the beamforming feedback being derived from received versions of the sounding packet,
determine a steering matrix based on the beamforming feedback, and
control a transmission, within a frame, of spatially steered data packets to the wireless communications devices,
wherein the spatially steered data packets are based on the steering matrix and data streams intended respectively for the wireless communication devices,
wherein the spatially steered data packets concurrently provide the data streams respectively within the frame to the wireless communication devices via different spatial wireless channels.

9. The apparatus of claim 8, wherein the beamforming feedback respectively comprise compressed versions of beamforming matrices, the compressed versions of beamforming matrices being derived from the received versions of the sounding packet.

10. The apparatus of claim 8, wherein the steering matrix is determined based on a spatial mapping matrix, and wherein the sounding packet is based on the spatial mapping matrix.

11. The apparatus of claim 8, wherein the sounding packet comprises a null data packet (NDP).

12. The apparatus of claim 11, wherein the processor electronics are configured to transmit a NDP announcement packet to indicate that the NDP will be transmitted.

13. The apparatus of claim 8, wherein the sounding packet comprises training fields.

14. The apparatus of claim 13, wherein a quantity of the training fields is included in a signal field of the sounding packet.

15. A system comprising:
antennas; and
circuitry communicatively coupled with the antennas and configured to
transmit, via the antennas, a sounding packet to wireless communication devices,
receive, in response to the sounding packet, feedback packets from the wireless communication devices, wherein the feedback packets collectively comprise beamforming feedback, the beamforming feedback being derived from received versions of the sounding packet, wherein the beamforming feedback respectively comprise compressed versions of beamforming matrices, the compressed versions of beamforming matrices being derived from the received versions of the sounding packet,
determine a steering matrix based on the beamforming feedback, and
transmit, within a frame, spatially steered data packets to the wireless communications devices via the antennas,
wherein the spatially steered data packets are based on the steering matrix and data streams intended respectively for the wireless communication devices,
wherein the spatially steered data packets concurrently provide the data streams respectively within the frame to the wireless communication devices via different spatial wireless channels.

16. The system of claim 15, wherein the steering matrix is determined based on a spatial mapping matrix, and wherein the sounding packet is based on the spatial mapping matrix.

17. The system of claim 15, wherein the sounding packet comprises a null data packet (NDP).

18. The system of claim 17, wherein the circuitry is configured to transmit a NDP announcement packet to indicate that the NDP will be transmitted.

19. The system of claim 15, wherein the sounding packet comprises training fields, and wherein a quantity of the training fields is included in a signal field of the sounding packet.

* * * * *